United States Patent
Sakamoto

(10) Patent No.: US 7,636,132 B2
(45) Date of Patent: Dec. 22, 2009

(54) TRANSMITTER, RECEIVER, WIRELESS SYSTEM, CONTROL METHOD, CONTROL PROGRAM, AND COMPUTER-READABLE RECORDING MEDIUM CONTAINING THE PROGRAM

(75) Inventor: Kenji Sakamoto, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 431 days.

(21) Appl. No.: 10/553,371

(22) PCT Filed: Apr. 15, 2004

(86) PCT No.: PCT/JP2004/005425

§ 371 (c)(1),
(2), (4) Date: Aug. 24, 2006

(87) PCT Pub. No.: WO2004/093404

PCT Pub. Date: Oct. 28, 2004

(65) Prior Publication Data

US 2007/0032198 A1    Feb. 8, 2007

(30) Foreign Application Priority Data

| Apr. 17, 2003 | (JP) | ............... | 2003-112668 |
| Apr. 12, 2004 | (JP) | ............... | 2004-117276 |
| Apr. 13, 2004 | (JP) | ............... | 2004-118331 |

(51) Int. Cl.
*H04N 5/38* (2006.01)
(52) U.S. Cl. .................................. 348/723
(58) Field of Classification Search ............... 348/723, 348/722, 21, 608; 375/240.12; 709/231, 709/233
See application file for complete search history.

(56) References Cited

U.S. PATENT DOCUMENTS

| 6,366,763 | B1 | 4/2002 | Ue et al. |
| 6,370,359 | B1 | 4/2002 | Ue et al. |
| 6,381,445 | B1 | 4/2002 | Ue et al. |
| 6,400,929 | B1 | 6/2002 | Ue et al. |
| 6,487,394 | B1 | 11/2002 | Ue et al. |
| 6,493,388 | B1* | 12/2002 | Wang .................... 375/240.12 |
| 6,597,894 | B1 | 7/2003 | Ue et al. |
| 7,191,246 | B2* | 3/2007 | Deshpande .................. 709/233 |
| 7,272,658 | B1* | 9/2007 | Edelman et al. ............. 709/231 |
| 2002/0021685 | A1 | 2/2002 | Sakusabe |
| 2002/0054578 | A1 | 5/2002 | Zhang et al. |
| 2002/0061064 | A1* | 5/2002 | Ishikawa et al. ........ 375/240.12 |

(Continued)

FOREIGN PATENT DOCUMENTS

EP    0936819 A2    8/1999

(Continued)

*Primary Examiner*—Paulos M Natnael
(74) *Attorney, Agent, or Firm*—Birch, Stewart, Kolasch & Birch, LLP

(57) ABSTRACT

A central wireless microcomputer of a central wireless unit (transmitter) constituting a wireless AV system identifies a content type of video and audio data to be transmitted, according to EPG, and sets a transmission rate of the video and audio data to be transmitted, according to a detected communication condition. According to the content type thus identified, the central wireless microcomputer executes transmission rate modification control by modifying the transmission rate thus set, with reference to an MPEG rate. Thus, even when the communication condition deteriorates, it is possible to minimize deterioration of the video and audio data and maintain data transmission as much as possible.

18 Claims, 12 Drawing Sheets

U.S. PATENT DOCUMENTS

| | | |
|---|---|---|
| 2002/0068534 A1 | 6/2002 | Ue et al. |
| 2002/0071052 A1 | 6/2002 | Itoh et al. |
| 2002/0073136 A1 | 6/2002 | Itoh et al. |
| 2002/0077064 A1 | 6/2002 | Ue et al. |
| 2002/0082039 A1 | 6/2002 | Ue et al. |
| 2002/0141447 A1 | 10/2002 | Leung et al. |
| 2002/0183026 A1 | 12/2002 | Naruse |
| 2002/0191722 A1 | 12/2002 | Naruse |
| 2003/0032419 A1 | 2/2003 | Shibasaki et al. |
| 2006/0019610 A1 | 1/2006 | Ue et al. |

FOREIGN PATENT DOCUMENTS

| | | |
|---|---|---|
| JP | 08-274756 A | 10/1996 |
| JP | 10-222933 A | 8/1998 |
| JP | 2000-189667 A | 7/2000 |
| JP | 2000-287173 A | 10/2000 |
| JP | 2001-25013 A | 1/2001 |
| JP | 2002-33676 A | 1/2002 |
| JP | 2002-33713 A | 1/2002 |
| JP | 2002-33714 A | 1/2002 |
| JP | 2002-288073 A | 10/2002 |
| JP | 2003-023659 A | 1/2003 |
| JP | 2003-50589 A | 2/2003 |
| WO | WO-02/11351 A2 | 2/2002 |
| WO | WO-02/32083 A1 | 4/2002 |

* cited by examiner

FIG. 1
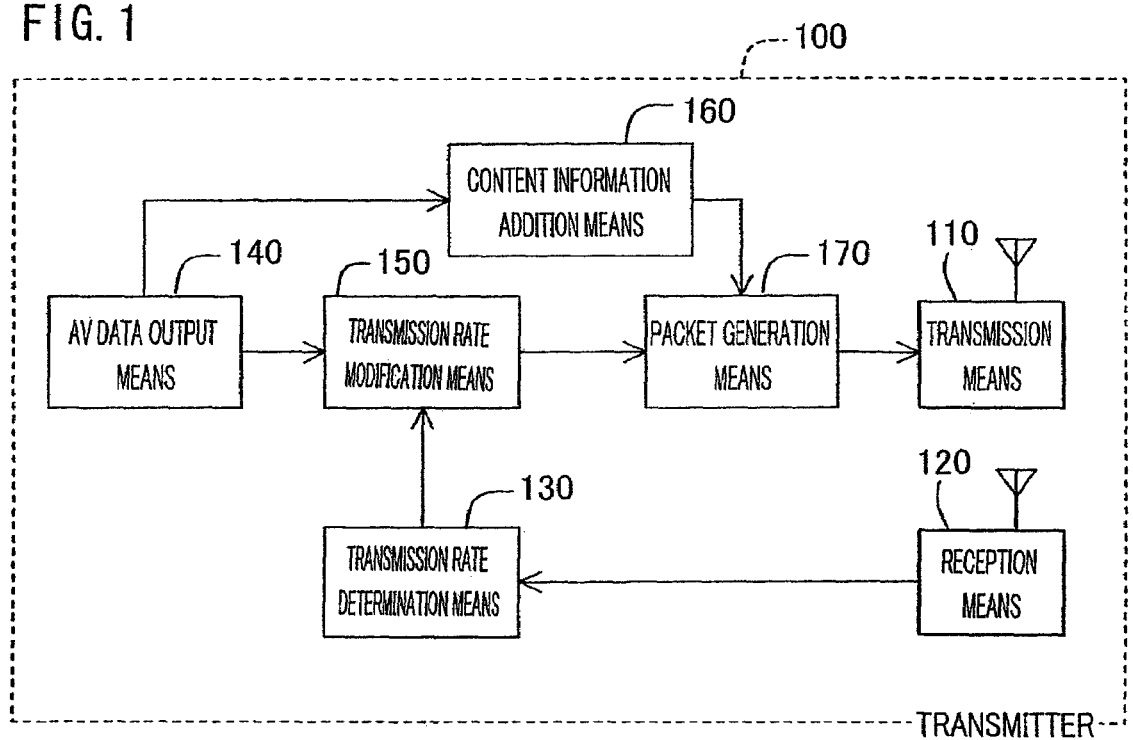
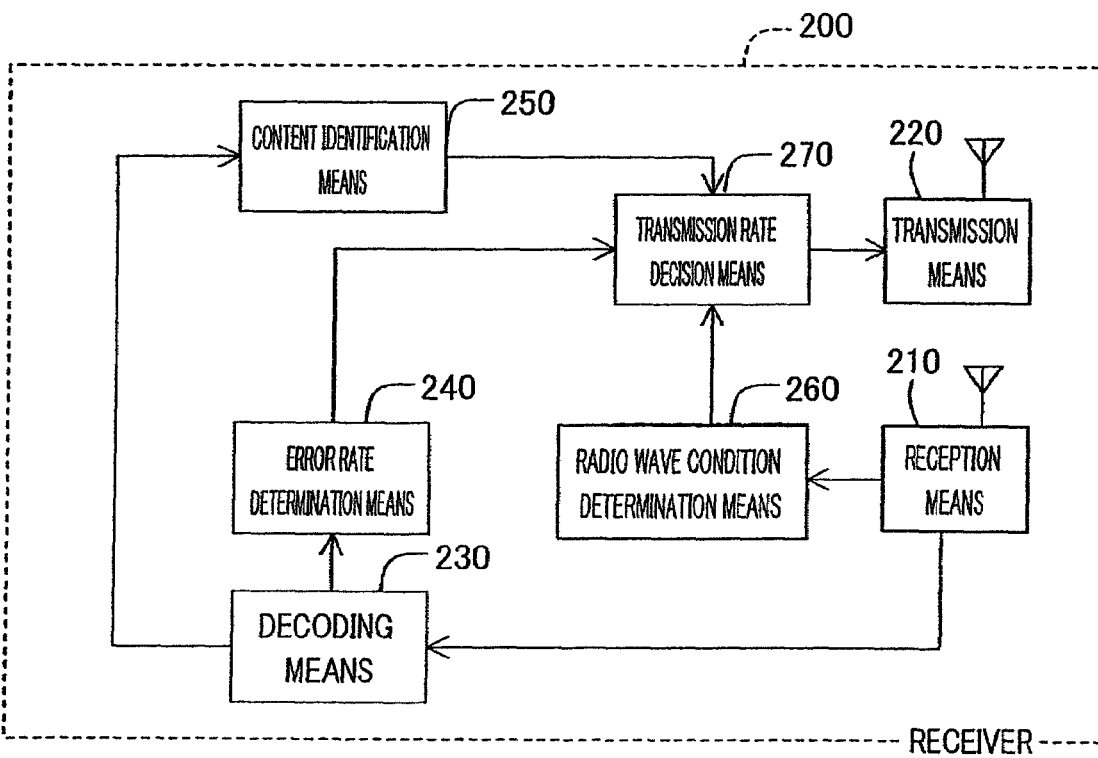

FIG. 6

○ EXAMPLES OF MPEG RATES

| SET VALUE | MPEG RATE (Mbps) | NUMBER OF TIMES OF RETRANSMISSION | SET VALUE | MPEG RATE (Mbps) | NUMBER OF TIMES OF RETRANSMISSION |
|---|---|---|---|---|---|
| | | | 0 x 10 | 6.53 | 3 |
| | | | 0 x 11 | 6.67 | 3 |
| | | | 0 x 12 | 6.78 | 2 |
| 0 x 03 | 2.13 | 31 | 0 x 13 | 6.89 | 2 |
| 0 x 04 | 2.87 | 20 | 0 x 14 | 7.00 | 2 |
| 0 x 05 | 3.48 | 15 | 0 x 15 | 7.09 | 2 |
| 0 x 06 | 3.99 | 11 | 0 x 16 | 7.18 | 2 |
| 0 x 07 | 4.42 | 9 | 0 x 17 | 7.26 | 1 |
| 0 x 08 | 4.79 | 8 | 0 x 18 | 7.34 | 1 |
| 0 x 09 | 5.11 | 7 | 0 x 19 | 7.41 | 1 |
| 0 x 0A | 5.39 | 6 | 0 x 1A | 7.48 | 1 |
| 0 x 0B | 5.63 | 5 | 0 x 1B | 7.54 | 1 |
| 0 x 0C | 5.85 | 4 | 0 x 1C | 7.60 | 1 |
| 0 x 0D | 6.05 | 4 | 0 x 1D | 7.66 | 1 |
| 0 x 0E | 6.22 | 3 | 0 x 1E | 7.71 | 1 |
| 0 x 0F | 6.39 | 3 | 0 x 1F | 7.76 | 1 |
| | | | 0 x 20 | 7.81 | 1 |
| | | | 0 x 21 | 7.86 | 1 |

FIG. 7

○EXAMPLES OF CONTENT-SPECIFIC SET VALUES

| CONTENT TYPE | MAXIMUM (Mbps) | MINIMUM (Mbps) |
|---|---|---|
| MOVIE | 0x11 (6.67) | 0x0B (5.63) |
| NEWS | 0x11 (6.67) | 0x05 (3.48) |
| DRAMA | 0x11 (6.67) | 0x07 (4.42) |
| MUSIC PROGRAM | 0x11 (6.67) | 0x09 (5.11) |
| SPORT | 0x11 (6.67) | 0x0A (5.39) |
| CARTOON | 0x11 (6.67) | 0x03 (2.13) |
| VARIETY | 0x11 (6.67) | 0x04 (2.87) |

TRANSMITTER, RECEIVER, WIRELESS SYSTEM, CONTROL METHOD, CONTROL PROGRAM, AND COMPUTER-READABLE RECORDING MEDIUM CONTAINING THE PROGRAM

TECHNICAL FIELD

The present invention relates to a transmitter, a receiver, a wireless system, a control method, a control program, and a computer-readable storage medium storing the same program.

BACKGROUND ART

Along with the recent explosive growth of the Internet, LANs (Local Area Networks) have been set up in more offices and households. Due in part to improvements in digital wireless communications technologies, there has been a rapidly growing need for a wireless LAN (i.e., a LAN that is set up wirelessly in order to remove the burden of cabling). Furthermore, partly because the wireless LAN can be used in a mobile environment of a mobile terminal as typified by a laptop computer, the wireless LAN is expected to be used in appreciable numbers in the future. A representative technology of the wireless LAN is the IEEE 802.11, which is standardized by the IEEE (Institute of Electrical and Electronics Engineers). This standardized technology defines an OSI (Open System Interconnection) model from a physical layer to an MAC (Media Access Control) layer, which serves as a lower layer of a data link. Further, the IEEE 802.11 can replace the Ethernet (registered trademark), which is a transmission channel in the wired LAN. Furthermore, the IEEE 802.11 is specified to provide a roaming function, which is an optional function peculiar to a wireless method.

Incidentally, a bandwidth of data transmission is reduced when a pair of a transmitter and a receiver communicates with each other by using a specific frequency (a transmission channel) at which another pair of a transmitter and a receiver communicates with each other. In order to avoid this, the devices about to use the transmission channel already occupied by the other devices need to be automatically transferred onto an unused transmission channel.

For example, Patent Document 1 discloses a channel-switching wireless communication device including a wireless communication section. The wireless communication section is provided with a 2.4 GHz band front-end circuit and a 5 GHz band front-end circuit so as to accommodate to the 2.4 GHz and 5 GHz bands. This makes it possible, in a wireless LAN system, to greatly increase the number of transmission channels which can be set simultaneously in the same area. This allows reduction of the risk of an interfering radio wave interrupting a communications link.

Further, Patent Document 2 discloses an information processing system which establishes information communications by searching for an information terminal device capable of the information communications, which determines and collects content which can be processed at a terminal of the information terminal device, and which generates a content information list. This information processing system causes a display section to display at least one of compression format information, bit rate information, sampling rate information, and extension information.

[Patent Document 1]
Japanese Unexamined Patent Publication No. 33676/2002 (Tokukai 2002-33676; published on Jan. 31, 2002) (FIG. 1)
[Patent Document 2]
Japanese Unexamined Patent Publication No. 50589/2003 (Tokukai 2003-50589; published on Feb. 21, 2003) (FIG. 1)

However, in such a conventional wireless communication device, when a communication condition deteriorates, an error rate of data is increased, so that retransmission requests are increased. Therefore, errors cannot be decreased sufficiently within a limited bandwidth, so that irretrievable block noise appears. In such a case, the error rate is reduced by reducing a transmission rate (bit rate), so that the block noise is reduced, but with deterioration in image quality.

The present invention has been made in order to solve the foregoing problems and has as an object to provide a transmitter, a receiver, a wireless system, a control method, a control program, and a computer-readable storage medium storing the same program, all of which make it possible to minimize deterioration of video and audio data and maintain a data transmission rate, as much as possible, even when a communication condition deteriorates.

DISCLOSURE OF INVENTION

In order to solve the foregoing problems, a transmitter according to the present invention is a transmitter for transmitting video and/or audio data (video data and/or audio data) to a receiver, the transmitter including: an SS transmitter/receiver (T/R) unit (reception means) for receiving, from the receiver, reception data containing information indicative of a communication condition detected at the receiver; and a central wireless microcomputer (transmission rate setting means) for setting a transmission rate of the video and/or audio data to be transmitted, according to the reception data.

Further, a transmitter control method according to the present invention is a method for controlling a transmitter which transmits video and/or audio data to a receiver, the method including the steps of: receiving, from the receiver, reception data containing information indicative of a communication condition detected at the receiver; and setting a transmission rate of the video and/or audio data to be transmitted, according to the reception data.

Further, a receiver according to the present invention is a receiver for receiving video and/or audio data from a transmitter, the receiver including: a second SS-CPU (communication condition detection means) for detecting a communication condition; and an SS T/R unit (transmission means) for transmitting, to the transmitter, transmission data containing information indicative of the communication condition detected by the second SS-CPU.

Further, a receiver control method according to the present invention is a method for controlling a receiver which receives video and/or audio data from a transmitter, the method including the steps of: detecting a communication condition; and transmitting, to the transmitter, transmission data containing information indicative of the communication condition thus detected.

According to the foregoing arrangement, it is possible to detect the communication condition at the receiver and transmit, to the transmitter, transmission data containing the information indicative of the communication condition thus detected. Further, at the transmitter, it is possible to set the transmission rate of the video and/or audio data to be transmitted, according to the information indicative of the communication condition, the information being contained in reception data received from the receiver. Thus, even when the communication condition deteriorates, it is possible to minimize deterioration of the video and audio data and maintain the transmission rate of the data as much as possible. Therefore, it is possible to maintain an optimum communication condition in an entire network.

Further, a transmitter according to the present invention is a transmitter for transmitting, to a receiver, video and/or audio data having a plurality of content types, the transmitter including: a central wireless microcomputer (content identification means) for identifying each of the content types of the video and/or audio data to be transmitted, according to information on an intra-frame frequency component of the video data and an inter-frame degree of change of the video data; and a central wireless microcomputer (transmission rate setting means) for setting a transmission rate of the video and/or audio data to be transmitted, according to the content type.

Further, a transmitter control method according to the present invention is a method for controlling a transmitter which transmits, to a receiver, video and/or audio data having a plurality of content types, the method including the steps of: identifying each of the content types of the video and/or audio data to be transmitted, according to information on an intra-frame frequency component of the video data and an inter-frame degree of change of the video data; and setting a transmission rate of the video and/or audio data to be transmitted, according to the content type.

According to the foregoing arrangement, even when program-related information such as EPG is not available, it is possible to identify the content type of the video and/or audio data to be transmitted. Moreover, it is possible to set the transmission rate of the video and/or audio data to be transmitted, according to the content type thus identified.

Therefore, it is possible to set the transmission rate at the transmitter, according to the content type. Specifically, in the case of a program such as "News" whose sound-transmitting function is emphasized, an error rate needs to be suppressed at the cost of image quality, by sufficiently decreasing a transmission rate of the program. Further, in the case of a program such as "Movie" whose image-transmitting function is emphasized, deterioration in image quality needs to be suppressed, by suppressing a degree by which a transmission rate of the program is decreased. Therefore, even when the communication condition deteriorates, it is possible to minimize deterioration of the video and/or audio data by maintaining the transmission rate according to the content type.

Further, a transmitter according to the present invention is a transmitter transmitting, to a receiver, video and/or audio data having a plurality of content types, the transmitter including: a central wireless microcomputer (content identification means) for identifying each of the content types of the video and/or audio data to be transmitted, according to information on an intra-frame frequency component of the video data and an inter-frame degree of change of the video data; a central wireless microcomputer (content information addition means) for adding, to the video and/or audio data to be transmitted, content information indicative of the content type of the video and/or audio data; an SS T/R unit (reception means) for receiving, from the receiver, reception data containing information indicative of a transmission rate determined at the receiver; and a central wireless microcomputer (transmission rate setting means) for setting the transmission rate of the video and/or audio data to be transmitted, according to the reception data.

Further, a transmitter control method according to the present invention is a method for controlling a transmitter which transmits, to a receiver, video and/or audio data having a plurality of content types, the method including the steps of: identifying each of the content types of the video and/or audio data to be transmitted, according to information on an intra-frame frequency component of the video data and an inter-frame degree of change of the video data; adding, to the video and/or audio data to be transmitted, content information indicative of the content type of the video and/or audio data; receiving, from the receiver, reception data containing information indicative of a transmission rate determined at the receiver; and setting the transmission rate of the video and/or audio data to be transmitted, according to the reception data.

According to the foregoing arrangement, even when program-related information such as EPG is not available, the transmitter can identify the content type of the video and/or audio data to be transmitted. Moreover, the transmitter adds the content information indicative of the content type thus identified to the video and/or audio data to be transmitted, so that the content information is transmitted to the receiver. Furthermore, the transmitter receives from the receiver the reception data containing the information indicative of the transmission rate determined at the receiver, and sets the transmission rate of the video and/or audio data to be transmitted, according to the reception data.

Therefore, the transmitter can transmit the video and/or audio data at the transmission rate determined at the receiver, according to the content type. Thus, even when the communication condition deteriorates, it is possible to minimize deterioration of the video and/or audio data by maintaining the transmission rate according to the content type.

The transmitter may be realized by a computer. In such a case, a computer-readable storage medium storing a transmitter control program for causing a computer to function as the means is also included in the scope of the present invention.

The receiver may be realized by a computer. In such a case, a computer-readable storage medium storing a receiver control program for causing a computer to function as the means is also included in the scope of the present invention.

For a fuller understanding of the nature and advantages of the invention, reference should be made to the ensuing detailed description taken in conjunction with the accompanying drawings.

BRIEF DESCRIPTION OF DRAWINGS

FIG. 1 is a block diagram showing respective basic arrangements of a transmitter and a receiver constituting a wireless AV system shown in FIG. 2.

FIG. 6 is a diagram showing a specific arrangement example of MPEG rates referred to when AV data is transmitted in the wireless AV system shown in FIG. 2.

FIG. 7 is a diagram showing a specific arrangement example of content-specific set values referred to when the AV data is transmitted in the wireless AV system shown in FIG. 2.

BEST MODE FOR CARRYING OUT THE INVENTION

A preferred embodiment of the present invention will be described in detail below with reference to the accompanying drawings.

First, a basic idea of the present invention will be described.

Figure 2:
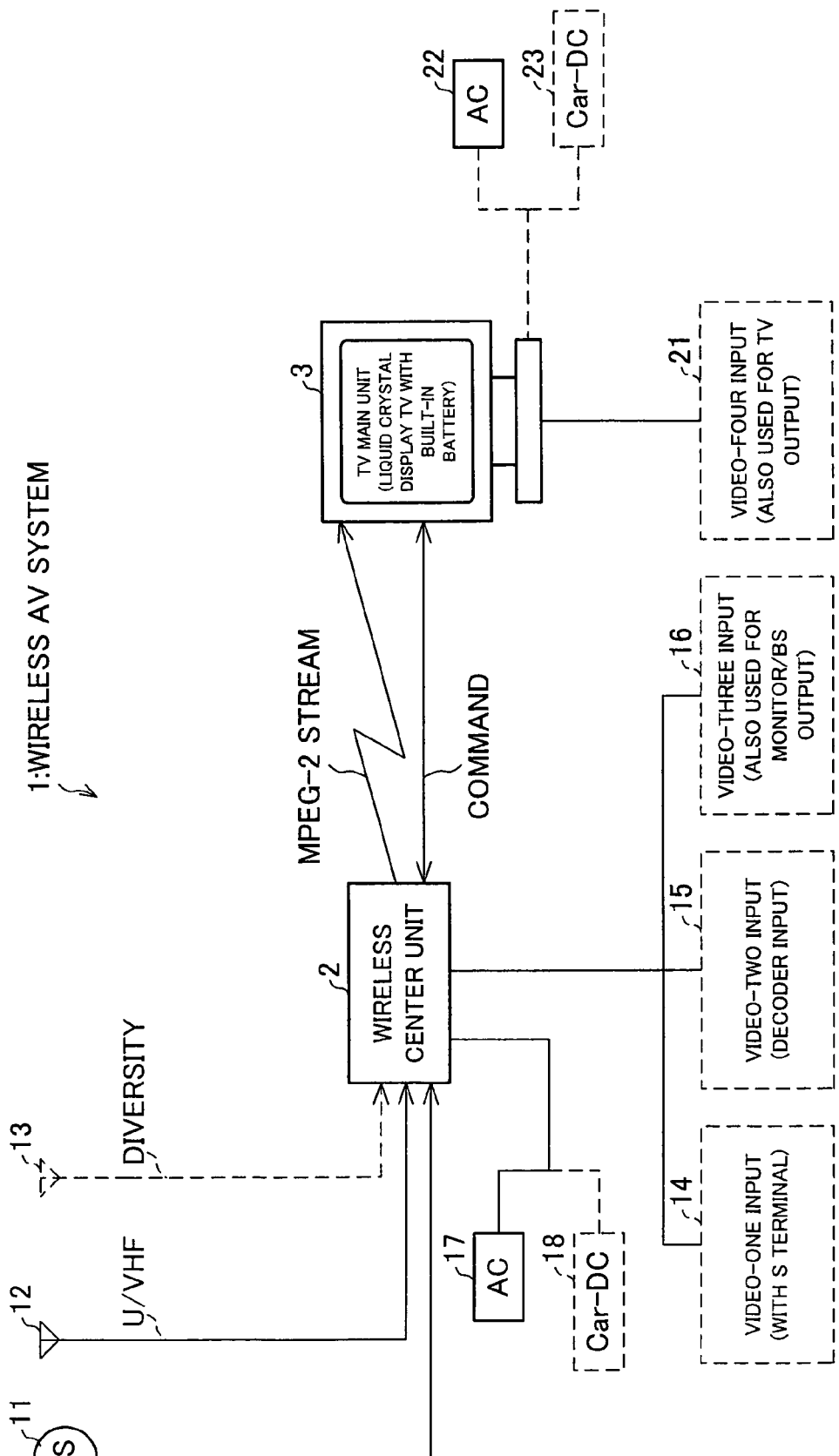
FIG. 2 is a block diagram showing a basic arrangement of the wireless AV system according to one embodiment of the present invention.

FIG. 1 is a diagram showing respective basic arrangements of a transmitter 100 and a receiver 200 constituting a wireless system which executes a transmission rate modification method of the present invention. In the present embodiment, as described later, a wireless AV system 1 arranged by applying the wireless system to a separate-display wireless TV receiver will be described in detail. Moreover, in an arrangement of the wireless AV system 1, the transmitter 100 and the receiver 200 correspond to a central wireless unit 2 and a TV main unit 3, respectively (FIG. 2).

As shown in FIG. 1, the transmitter 100 includes: transmission means 110 for transmitting video and audio data (hereinafter referred to as "AV data"); reception means 120 for receiving the AV data; transmission rate determination means 130 for determining a transmission rate based on reception data; AV data output means 140 for outputting the AV data to be transmitted; transmission rate modification means 150 for modifying the transmission rate according to content information added to the reception data; content information addition means 160 for adding, to the AV data to be transmitted, the content information indicative of content of the AV data to be transmitted; and packet generation means 170 for generating a packet from the AV data, to which the content information has been added.

The receiver 200 includes: reception means 210 for receiving the AV data; transmission means 220 for transmitting the AV data according to the transmission rate that has been determined; decoding means 230 for decoding the reception data; error rate determination means 240 for determining an error rate of the reception data thus decoded; content identification means 250 for identifying the content by extracting the content information from the AV data that has been transmitted; radio wave condition determination means 260 for determining a radio wave condition; and transmission rate decision means 270 for deciding the transmission rate according to a determination result obtained by the radio wave condition determination means 260.

The transmitter 100 serves as a central wireless unit of a liquid crystal display TV (LCD TV) described later, and the receiver 200 serves as a TV main unit of the LCD TV.

A technique for realizing a wireless AV system is specified in a standard specification, called the HAVi (Home Audio/Video Interoperability) Architecture, which was standardized in January 2001. As described in the outline (1 General, 1.1 Scope) of the HAVi V1.0 Specification, this specification makes it possible to provide an interface allowing a user to control a device, which is connected to a consumer electronic device and a computer, by using another device. The HAVi specification assumes a network constructed by consumer electronic devices that are in conformity with, e.g., the IEEE 1394 and the IEC (International Electrotechnical Commission) 61883. Further, the outline of the specification describes every user can freely use the devices connected to the network achieved according to the HAVi specification. Thus, the construction of the AV network by connecting the AV devices at home allows the user to freely use the devices in combination, even when the device are placed in separate rooms.

Further, in addition to serving as such a home AV network, the transmitter 100 and the receiver 200 may serve as a wireless communications terminal such as a mobile phone/PHS (Personal Handyphone System) (registered trademark) or a personal digital assistant (hereinafter referred to as "PDA") which performs wireless communications.

In the foregoing arrangement, when the communication condition deteriorates, the error rate is reduced by reducing a transmission rate (bit rate), so that noise is reduced, but with deterioration in image quality. Focusing attention on content types of data to be transmitted, the inventors thought of causing a bit rate to vary in accordance with the content types. Some of the content types may be overlapped with some block noise. (Examples of such content types are image data (e.g., static images and almost-static images) and news data.) Other of the content types may be rough in image quality but should be smooth in movement. (An example of such content types is sports program data.) Therefore, the bit rate is caused to vary in accordance with the content types.

Thus, when the communication condition changes (particularly when it deteriorates), such control is executed as to cause the bit rate to vary in accordance with the content types of the AV data thus transmitted, instead of decreasing the bit rate at a uniform rate. In FIG. 1, the transmission rate modification means 150 of the transmitter 100 or the transmission rate decision means 270 of the receiver 200 executes transmission rate modification control according to the content types.

Figure 8:
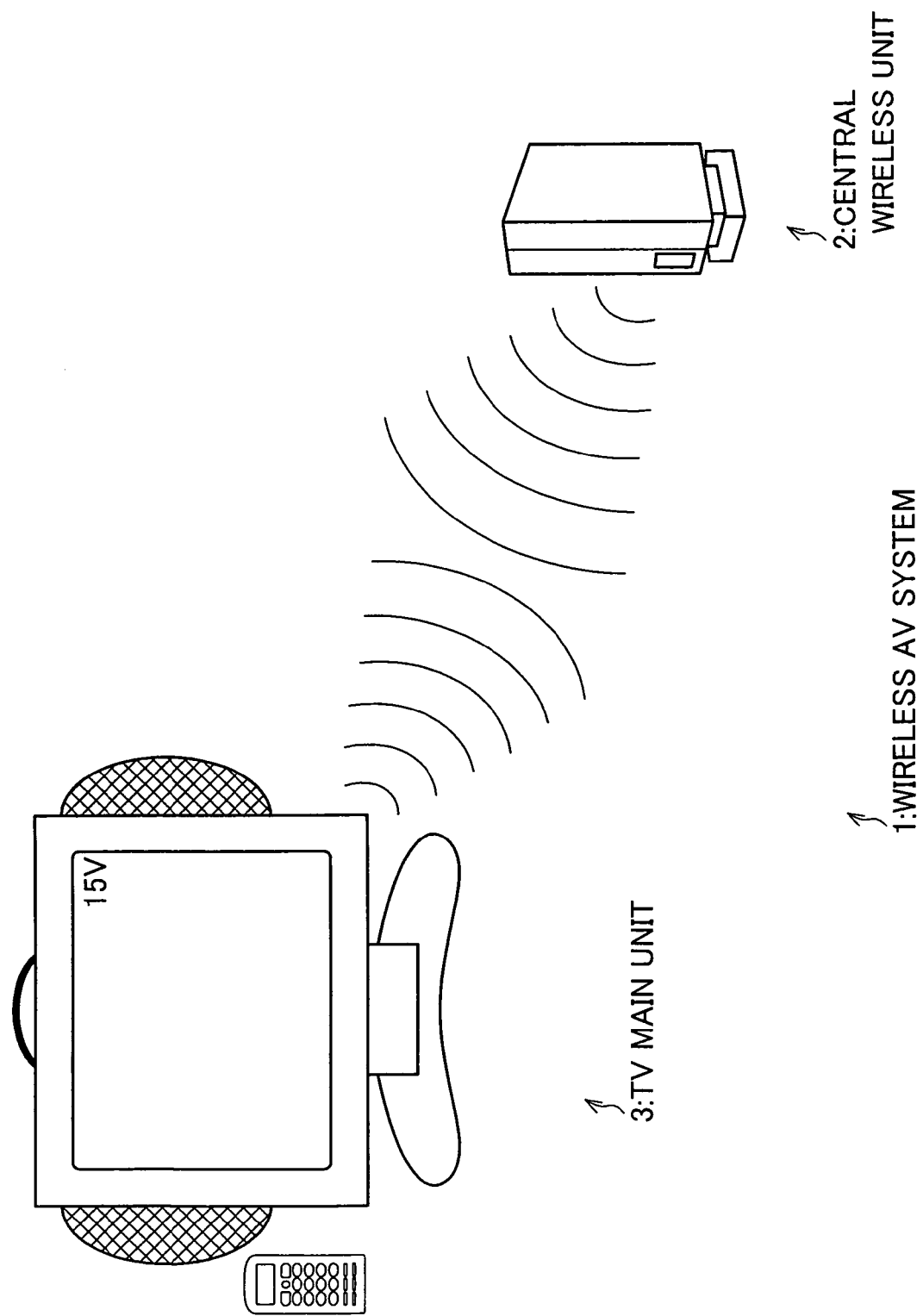
FIG. 8 is a schematic diagram showing the wireless AV system shown in FIG. 2.

FIG. 2 is a block diagram showing an arrangement of a wireless AV system 1 according to one embodiment of the present invention. The wireless AV system 1 of the present embodiment is an example of applying the present invention to a separate-display wireless TV receiver. FIG. 8 is an explanatory diagram schematically showing the wireless AV system 1 serving as the separate-display wireless TV receiver.

As shown in FIGS. 2 and 8, the wireless AV system 1 includes: a central wireless unit 2 serving as a base device; and a television (TV) main unit 3 serving as a portable terminal (wireless terminal). The central wireless unit 2 (wireless communication apparatus, central apparatus) and the TV main unit 3 (wireless communication apparatus, display apparatus) are paired to form a wireless transmission network. Note that the central wireless unit 2 corresponds to the transmitter 100 (FIG. 1), and the TV main unit 3 corresponds to the receiver 200 (FIG. 1).

As shown in FIG. 8, the TV main unit 3 is a wireless unit having a built-in battery. Further, the TV main unit 3 is equipped with a remote controller for remotely controlling a VCR (video cassette recorder) and other devices. Further, the central wireless unit 2 is connected to (i) antennas such as a BS antenna and a U/VHF antenna; (ii) AV devices such as a DVD player and the VCR; and the like. Moreover, the video and/or audio data is transmitted wirelessly from the central wireless unit 2 to the TV main unit 3.

As shown in FIG. 2, the central wireless unit 2 includes: (i) various antenna terminals such as, a BS terminal 11, a U/VHF antenna terminal 12, and a diversity terminal 13; (ii) a video-one input (with an S-terminal) 14; (iii) a video-two input (decoder input) 15, (iv) a video-three input (also used for monitor/BS output) 16, an AC power supply section 17, and a Car-DC power supply section 18. A device such as a digital VCR or the DVD player can be connected to the video-one input 14, the video-two input 15, and the video-three input 16.

The TV main unit 3 includes: a video-four input (used for TV output) 21, to which such a device as a digital VCR or a DVD (Digital Versatile Disc) player is connected; an AV power supply section 22; and a Car-DC power supply section 23.

The TV main unit 3 is a portable or transportable thin-shaped display device having the built-in battery, and can be detached from the central wireless unit 2. The TV main unit 3 is a broad concept which encompasses various display devices such as a liquid crystal display television (hereinafter referred to as "LCD TV"), an inorganic EL/organic EL display, and a plasma display, and is not limited by a display mechanism. Further, in this description, whereas the TV main unit 3 mainly has a display function and an audio function, the central wireless unit 2 mainly has a control function of controlling a tuner section and the TV main unit 3. The following description assumes that TV main unit 3 according to the present embodiment is an LCD TV exemplified as the thin-shaped display device.

The data (video and/or audio data) is exchanged between the central wireless unit 2 and the TV main unit 3, according to an SS (Spread Spectrum) wireless method. The SS wireless method is in conformity with the IEEE 802.11 specification. Since the 5 GHz band has recently become available, the data transmission and data reception may be carried out with the use of the 5 GHz band instead of the 2.4 GHz band. The data transmitted from the central wireless unit 2 to the TV main unit 3 is in conformity with the MPEG (Moving Picture Expert Group) 2 video compression format, and is transmitted via a communication line which allows 10 Mbps transmission of data such as moving image data, DVD-Video data, and digital broadcasting data. Further, command (control command) transmission is carried out between the central wireless unit 2 and the TV main unit 3, according to the SS wireless method.

When an encoded stream (bit row) such as an MPEG video stream and an MPEG audio stream, and another encoded stream are put into an actual use, the encoded streams need to be synchronized and multiplexed into a single stream, and the single stream needs to be converted into data whose format is in conformity with a physical format or protocol inherent in a storage medium, a network, or the like.

The MPEG-2 system includes the MPEG-2 Program Stream (MPEG-2 PS) and the MPEG-2 Transport Stream (MPEG-2 TS). The MPEG-2 PS, as with the MPEG-1, constitutes a single program. The MPEG-2 TS can constitute a plurality of programs.

The MPEG streams, a large number of which are one-bit flags, are byte streams each arranged based on each unit such as header. The MPEG system as a whole has a common data structure which makes possible highly reliable separation processing. That is, a portion of data having no fixed length is preceded, in the data structure, by a piece of information that indicates the length. When the portion is unnecessary, the portion is skipped or a start of the next group of data is located.

For prevention of overflow and underflow of video and audio signals in a decoder, a device for receiving video and audio signals each compressed in conformity with the MPEG-2 encoding method needs to match (i) the sampling frequencies of the encoded video signal and the encoded audio signal, with (ii) the sampling frequencies or the STCs (System Time Clocks) of decoded video signal and decoded audio signal, respectively.

For this reason, PCR (Program Clock Reference) or SCR (System Clock Reference) specified in the MPEG-2 System specification (ISO/IEC 13818-1) is used in such a decoding device, so that the sampling frequency of decoded video and audio data coincides with that of the encoded video and audio data.

Figure 3:
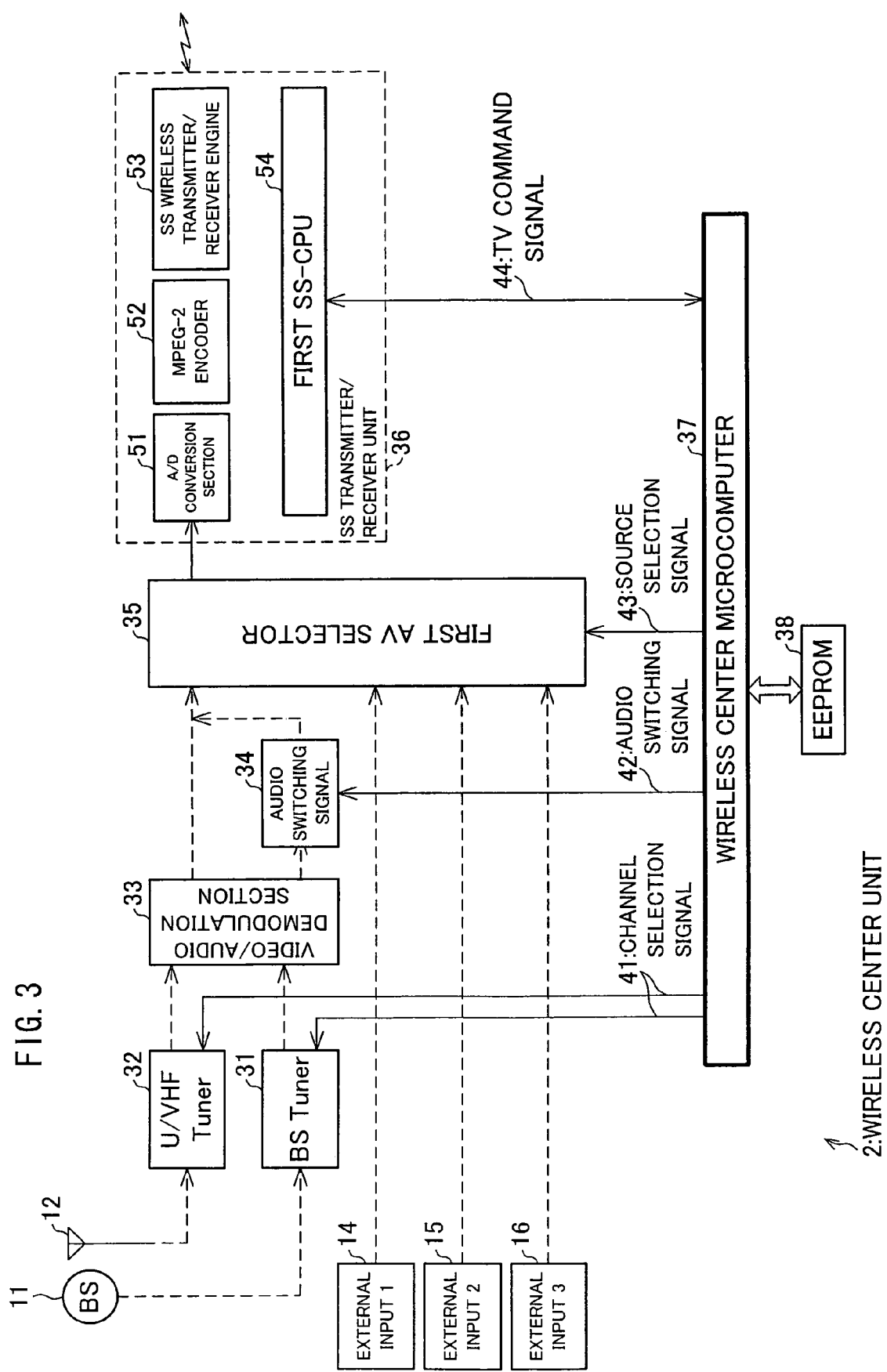
FIG. 3 is a block diagram showing an arrangement of a central wireless unit serving as the transmitter constituting the wireless AV system shown in FIG. 2.

FIG. 3 is a block diagram showing an arrangement of the central wireless unit 2 of the wireless AV system 1.

As shown in FIG. 3, the central wireless unit 2 includes a BS tuner 31, a U/VHF tuner 32, a video/audio demodulation section 33, a audio switching section 34, a first AV selector 35, an SS transmitter/receiver (T/R) unit 36 (communication means), a central wireless microcomputer 37 (content identification means and transmission rate setting means), and an EEPROM (electrically erasable programmable ROM) 38. The BS tuner 31 is connected to the BS terminal 11, and receives and selects a BS broadcasting program in accordance with a channel selection signal. The U/VHF tuner 32 is connected to the U/VHF antenna terminal 12 and receives and selects a U/VHF broadcasting program according to the channel selection signal. The video/audio demodulation section 33 demodulates a video/audio (AV) signal selected and received by the BS tuner 31 or the U/VHF tuner 32. The audio switching section 34 switches, according to an audio switching signal, between received audio and program-related information such as EPG (Electrical Program Guide). The first AV selector 35 selects, according to a source selection signal, (i) received video/audio information; (ii) the program-related information; and (iii) information externally inputted via the video-one input (external input 1) 14, the video-two input (decoder input; external input 2) 15, and the video-three input (used for monitor/BS output; external input 3) 16. The SS T/R unit 36 transmits and receives a TV command signal 44, converts the data selected by the first AV selector 35 into data which is compliant with MPEG-2 video compression format, and transmits the data to the TV main unit 3 according the SS wireless method. The central wireless microcomputer 37 transmits the channel selection signal 41, the audio switching signal 42, and the source selection signal 43, and entirely controls the central wireless unit 2 by transmitting and receiving the TV command signal 44. The EEPROM 38 is an electrically rewritable nonvolatile memory which stores various types of data such as a control program of the central wireless microcomputer 37, communications control data, and content-specific MPEG rates.

The central wireless unit 2 includes the plural (two in this arrangement) broadcast receiving tuners, and at least one of the BS tuner 31 and the U/VHF tuner 32 may be a tuner capable of receiving terrestrial digital broadcasting.

The SS T/R unit 36 includes an A/D conversion section 51, an MPEG-2 encoder 52, an SS wireless T/R engine 53, and a first SS-CPU 54 (communication condition detection means). The A/D conversion section 51 converts the data selected by the first AV selector 35 into a digital signal. The MPEG-2 encoder 52 converts the data into data which is in conformity with the MPEG-2 video compression format. The SS wireless T/R engine 53 includes: (i) an SS wireless device for transmitting the data in accordance with the SS wireless method; and (ii) a wireless control section. The first SS-CPU 54 controls each of the components of the SS wireless T/R unit 36 and detects a radio wave condition.

As shown in FIGS. 6 and 7, described later, the EEPROM 38 stores the content-specific MPEG rates in tabular form. By changing programs to be written in the EEPROM 38, various specifications of the central wireless unit 2 and the TV main unit 3 can be changed. That is, a program ROM such as a nonvolatile memory (e.g., an EPROM or EEPROM) is used for the sake of avoiding a time loss incurred by changing mask ROMs for each debugging in system development, so that it is possible to greatly reduce time required for program development and modification. Further, the EEPROM's program content can be rewritten by downloading a program into the EEPROM, and this makes it easy to upgrade and change functions.

The SS wireless T/R engine 53 has functions of: (i) transmitting the MPEG-2 stream, a command, and the like to an SS T/R unit 61 (described later and see FIG. 4) of the TV main unit 3; and (ii) transmitting and receiving commands to and from the SS T/R unit 61.

Particularly, the first SS-CPU 54 functions as radio wave condition detection means for detecting a communication condition (radio wave strength, channel interference) between the central wireless unit 2 and the TV main unit 3, according to a field intensity (electric field intensity) of a received radio wave and a retransmission request based on an error rate. Information indicative of the radio wave condition thus detected is transmitted as the TV command signal 44 to the central wireless microcomputer 37. The present embodiment is arranged such that the first SS-CPU 54 of the central wireless microcomputer 37 has the radio wave condition detection function. However, the present embodiment may be arranged such that: a second SS-CPU 84 of the TV main unit 3 has the radio wave condition detection function, and the information indicative of the radio wave condition thus detected is transmitted as the TV command signal 44 to the TV main unit 3. Alternatively, the present embodiment may be arranged such that both of the first SS-CPU 54 and the second SS-CPU 84 have the radio wave condition detection function. Furthermore, the present arrangement may be arranged such that a TV microcomputer 64 or the central wireless microcomputer 37 performs the radio wave condition detection function.

The central wireless microcomputer 37 entirely controls the central wireless unit 2. The central wireless microcomputer 37 identifies a content type of video and audio data to be transmitted, according to EPG. The central wireless microcomputer 37 sets a transmission rate of the audio and video data to be transmitted, according to the communication condition thus detected. The central wireless microcomputer 37 executes transmission rate modification control by modifying a transmission rate thus set, according to the content type that has been identified. A specific example of the transmission rate modification control is described later with reference to FIG. 5.

Figure 4:
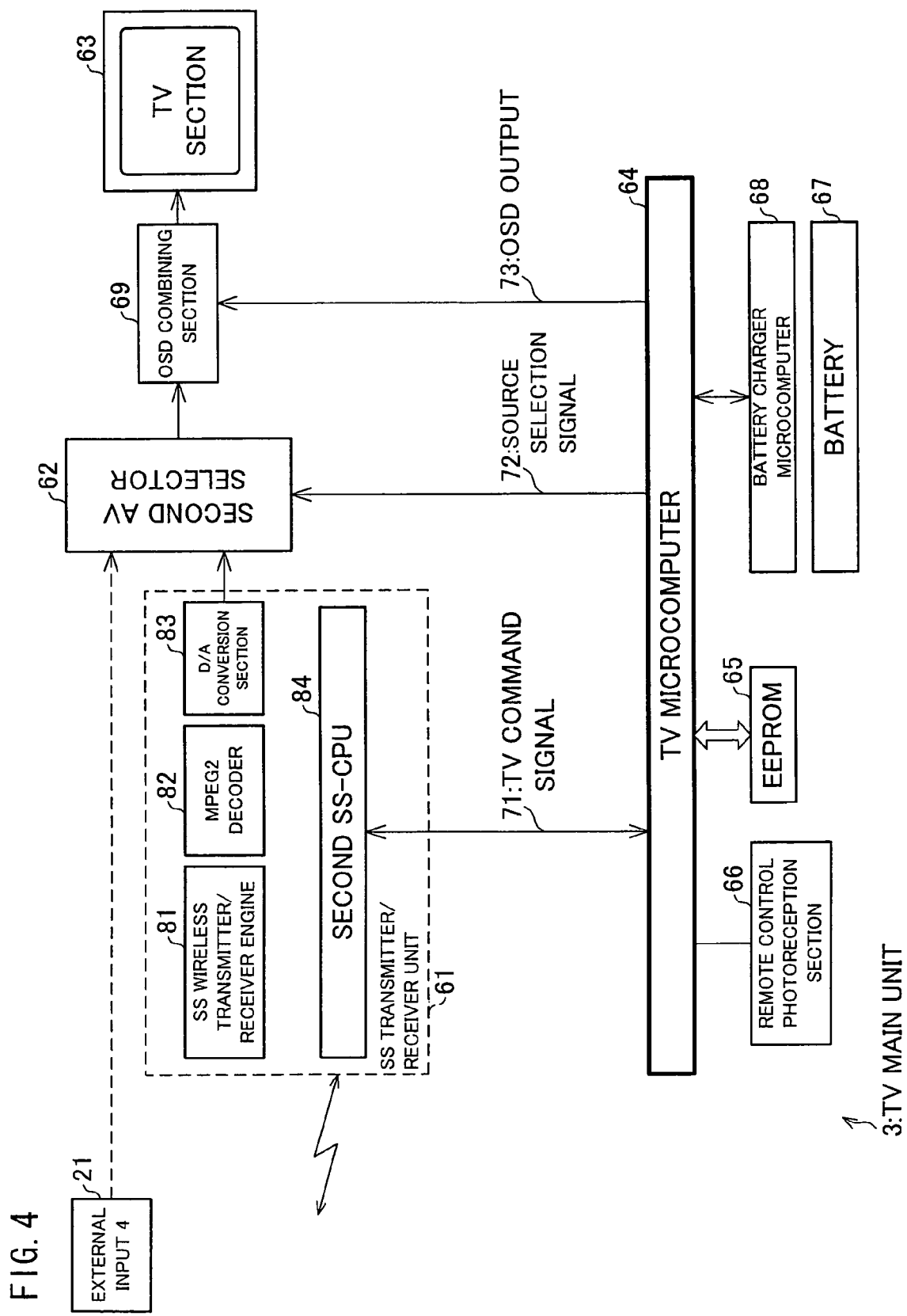
FIG. 4 is a block diagram showing an arrangement of a TV main unit serving as the receiver constituting the wireless AV system shown in FIG. 2.

FIG. 4 is a block diagram showing an arrangement of the TV main unit 3 of the wireless AV system 1.

As shown in FIG. 4, the TV main unit 3 includes the SS T/R unit 61 (communication means), a second AV selector 62, a TV section 63, a TV microcomputer 64, an EEPROM 65, a remote control (RC) photoreception section 66, a battery 67, and a battery charger microcomputer 68. The SS T/R unit 61 transmits and receives a TV command signal 71 so as to receive the MPEG-2 stream and the command transmission data which are transmitted from the SS T/R unit 36 of the central wireless unit 2, and decodes the received MPEG-2 stream and the command transmission data into original data, respectively. The second AV selector 62 selects the data decoded by the SS T/R unit 61 and an AV signal sent from outside via the video-four input (used for TV output) 21. The TV section 63 includes an LCD or the like, carries out display in accordance with the video signal, and carries out audio output in accordance with the audio signal. The TV microcomputer 64 transmits and receives the TV command signal 71 and entirely controls the TV main unit 3 by transmitting a source selection signal 72, an OSD (on-screen display) 73, and the like. The EEPROM 65 is an electrically rewritable nonvolatile memory which stores various types of data such as a control program of the TV microcomputer 64, communications control data, and a transmission channel switching program. The RC photoreception section 66 receives a control command from a remote control (RC) device (not shown). The battery charger microcomputer 68 controls charging and discharging of the battery 67.

The SS T/R unit 61 includes an SS wireless T/R engine 81, an MPEG-2 decoder 82, a D/A conversion section 83, and the second SS-CPU 84 (communication condition detection means). The SS wireless T/R engine 81 includes (i) an SS wireless device for receiving data transmitted according to the SS wireless method; and (ii) a wireless control section. The MPEG-2 decoder 82 decodes the received MPEG-2 stream. The D/A conversion section 83 converts the decoded data into an analog signal. The second SS-CPU 84 controls each component of the SS T/R unit 61 and detects a radio wave condition.

The SS wireless T/R engine 81 has functions of: (i) receiving an MPEG-2 stream, a command, and the like from the SS T/R unit 36 of the central wireless unit 2; and (ii) transmitting the command and the like from the SS T/R unit 61.

The TV microcomputer 64 has an OSD generation function section, and causes the OSD generation function section to display, on a TV screen or other screens, information such as a program channel, time, and volume. Such information is displayed on a screen of a general image device (e.g., a TV) or a general electronic device (e.g., a teleconference system). Such OSD data is not stored in the form of an image but stored in the form of a bitmap. The bitmap is converted into pixel values that are in compliant with the YUV format and that are represented by Y, Cb, and Cr. Pixels expresses the pixel values thus converted, with the result that the information is so displayed as to be superimposed on an original image such as a TV broadcast. Further, when connecting the video-four input terminal (used also as a TV output terminal) 21 to an image playback device (not shown) such as a DVD player, the OSD data can be so displayed as to be superimposed on an original image shown on the display screen. The superimposing of the OSD display on the original image is carried out by an OSD combining section 69 (FIG. 4).

Further, the TV main unit 3 includes a speaker, a key input section, a slot, and the like, all of which are not shown. The TV main unit 3 may be arranged such that: a card-type external extended storage medium can be inserted into and ejected from the slot, and data is read out directly from the card-type external extended storage medium when the card-type external extended storage medium is inserted into the slot. Examples of the card-type external extended storage medium are an SRAM (Static RAM) card, a compact flash (CF) (registered trademark) memory card, a smart media, a memory stick, and a micro hard disk drive (HDD). The SRAM card must be supplied with power backup in order to retain information. The compact flash includes a flash memory which does not need to be supplied with power backup. The micro hard disk drive is roughly the size of the compact flash (registered trademark) memory card or can be inserted into a PC-card Type II.

The RC photoreception section 66 is an optical communication port which uses IR (infrared rays) and receives an optical signal from the RC device for controlling the central wireless unit 2 or the TV main unit 3 in various ways. Specifically, the RC photoreception section 66 is either an I/O port or a wireless communication port which uses radio waves. The I/O port performs optical communication in conformity with standards (e.g., IrDA (Infrared Data Association) and ASK) for transmitting data by using infrared rays.

The battery 67 supplies power to each section of the TV main unit 3. The battery charger microcomputer 68 detects a state in which the battery 67 can be charged, for example when the TV main unit 3 is connected to the central wireless unit 2, a cradle, or the like. Then, the battery charger microcomputer 68 carries out control such that a charge medium (not shown) of the battery charger 67 is charged and discharged via a power supply terminal (not shown). Specifically, the battery charger microcomputer 68 calculates a total discharge current of a battery pack. When the battery charger microcomputer 68 determines that a remaining capacitance of the battery pack is below a predetermined value, the battery charger microcomputer 68 starts charging. During the charging, the battery charger microcomputer 68 calculates a total charging current supplied to the battery pack. When the battery charger microcomputer 68 determines that the battery pack is fully charged, the battery charger microcomputer 68 stops the charging. The battery 67 thus charged serves as a main power supply of the TV main unit 3 when the TV main unit 3 is disconnected from a commercial power supply so as to serve as a portable TV. In this way, the battery 67 supplies power to each component of the TV main unit 3

Operation of the wireless AV system 1 thus arranged will be described below.

Figure 5:
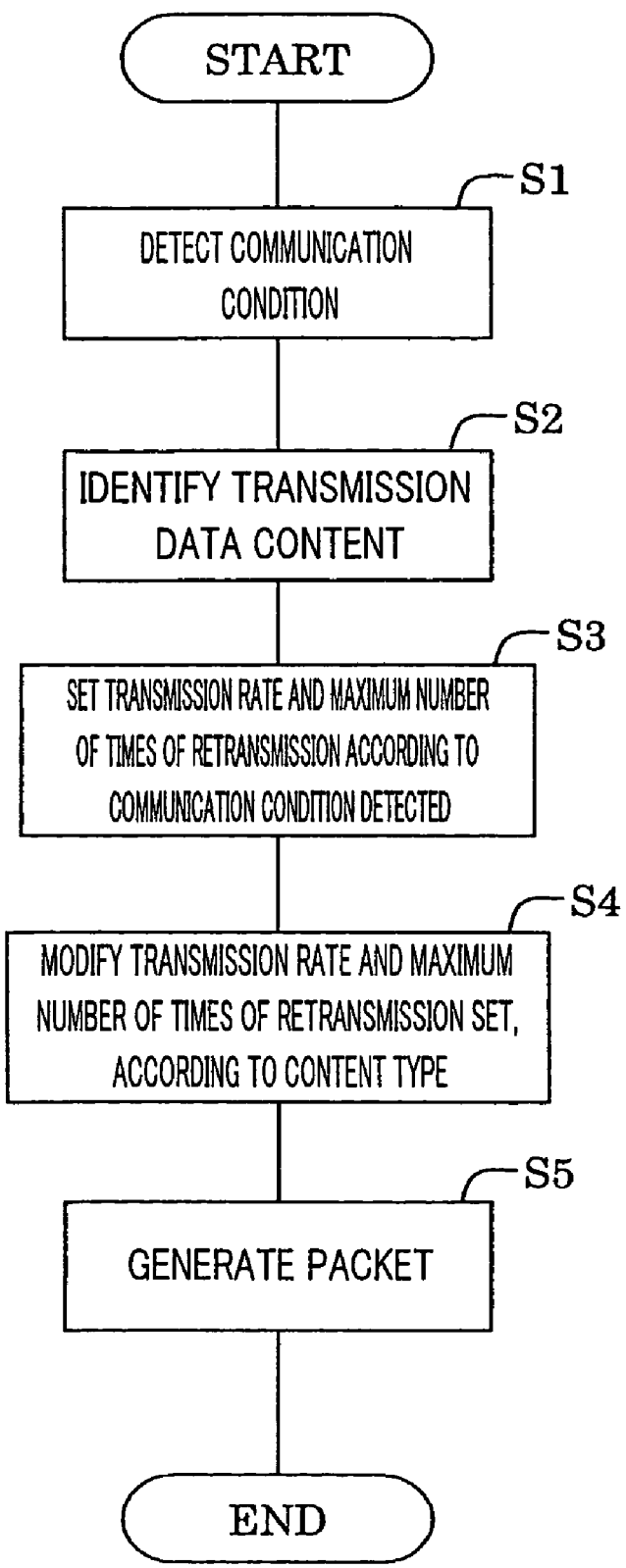
FIG. 5 is a flow chart showing a process of modifying a transmission rate in the wireless AV system shown in FIG. 2.

FIG. 5 is a flow chart showing a process of modifying a transmission rate of the wireless AV system 1, and the process is executed by the central wireless microcomputer 37. In FIG. 5, "S" represents each step of the process.

FIGS. 6 and 7 are diagrams showing specific arrangement examples of MPEG rates referred to when AV data is transmitted. FIG. 6 shows examples of the MPEG rates, and FIG. 7 shows examples of content-specific set values.

As shown in FIG. 6, the content types are given respective set values, and each of the set values is given a MPEG rate (Mbps) and a maximum number of times of retransmission. Further, each of the content types is given a maximum transmission rate and a minimum transmission rate.

As shown in FIG. 7, the contents types include Movie, News, Drama, Music Program, Sport, Cartoon, and Variety. Each of the content types has maximum and minimum transmission rate set values and maximum and minimum MPEG rates (Mbps). For example, the "Movie" content has a maximum transmission rate set value of "0×11", a maximum transmission rate of 6.67 (Mbps), a minimum transmission rate set value of "0×0B", and a minimum transmission rate of 5.63 (Mbps). The maximum transmission rate is applied in good communication conditions, and the minimum transmission rate is applied when the communication condition deteriorates.

As shown in FIG. 6, each of the set values is given an MPEG rate (Mbps) and a maximum number of times of retransmission. For example, in a good communication condition, both of the "Movie" and "News" contents have a maximum transmission rate set value of "0×11" and a maximum number of times of retransmission of "3". However, when the communication condition deteriorates, the "Movie" content has a minimum transmission rate set value of "0×0B" and a minimum number of times of retransmission of "5", and the "News" content has a minimum transmission rate set value of "0×0×5" and a minimum number of times of retransmission of "15". That is, when the communication condition deteriorates, the transmission rate of the "Movie" content is kept at the predetermined level of 5.63 (Mbps). This is because there is not much point in transmitting the "Movie" content at the cost of greatly degrading image quality. Meanwhile, the minimum transmission rate of the "News" content is greatly decreased to 3.48 (Mbps), but the maximum number of times of retransmission is increased to "15" so that the data is transmitted as much as possible. This is because communication is more important than image quality in the case of the "News" content. The "Drama" and "Music Program" contents have transmission rates between those of "Movie" and "News". Note that the content types and the MPEG rates are taken merely as examples and are not to be limited to those described above. In this way, the bit rates are varied in accordance with the content types, depending on changes in communication condition.

The process shown in FIG. 5 will be described below. First, in step S1, a communication condition in which the central wireless unit 2 and the TV main unit 3 communicate with each other is detected. In step S2, a content type of AV data to be transmitted is identified. The content type is identified by the video and audio demodulation section 33 according to program-related information, such as EPG, which is extracted from the AV data. In this arrangement, as shown in FIG. 7, each of the content types such as Movie, News, Drama, Music Program, Sport, Cartoon, and Variety are identified. Next, in step S3, a transmission rate and a maximum number of times of retransmission are set based on the communication condition that has been detected. In step S4, the transmission rate and the maximum number of times of retransmission thus set are modified in accordance with the content type, with reference to the MPEG rates shown in FIG. 6. Then, in step S5, a transmission AV data packet is generated so as to be transmitted at the transmission rate thus set and modified. This completes the process shown in FIG. 5.

Figure 9:
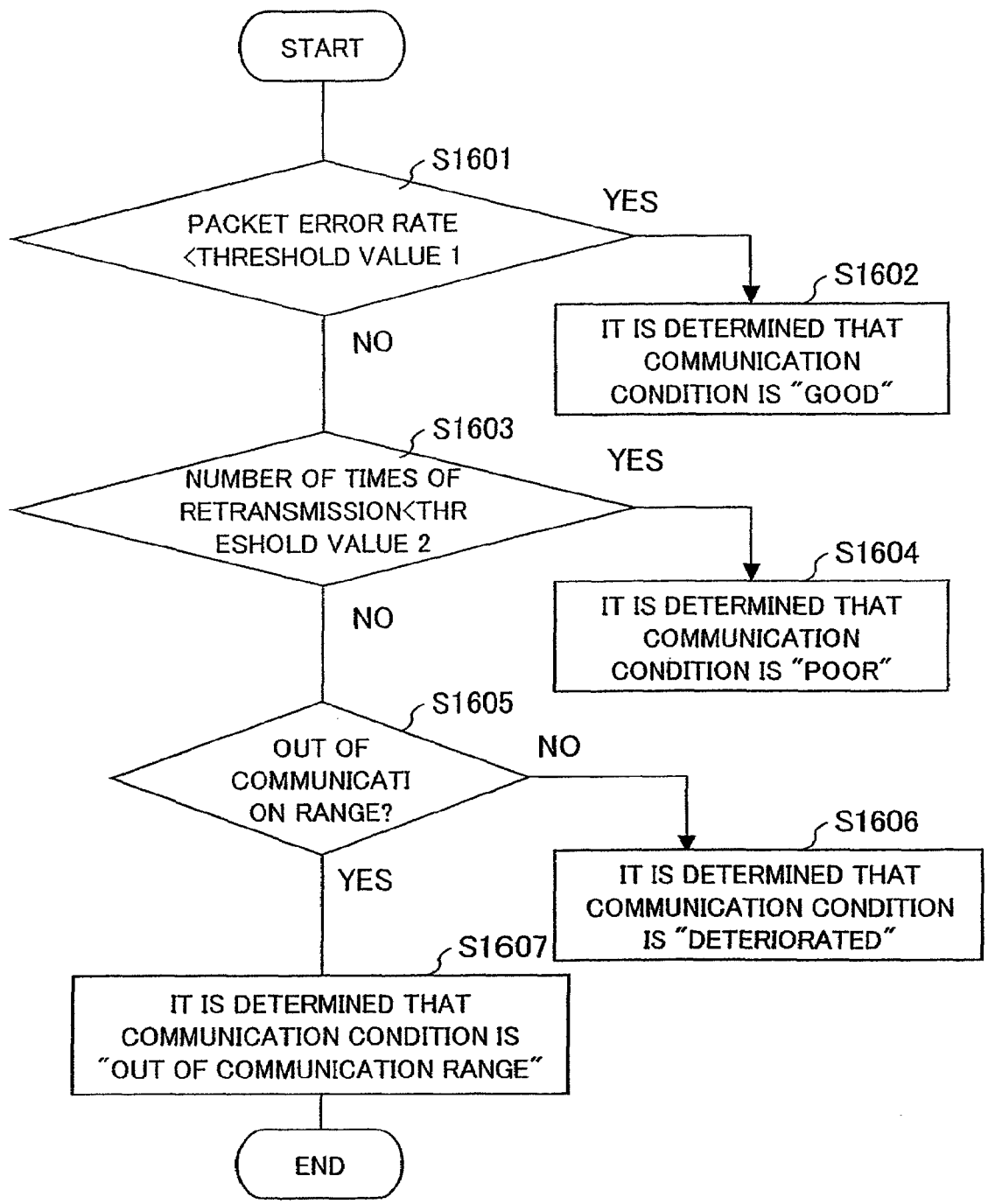
FIG. 9 is a flow chart showing a process of determining a communication condition in the TV main unit of the wireless AV system shown in FIG. 2.

FIG. 9 is a flow chart showing a process of determining a communication condition in the wireless AV system 1. Described below with reference to FIG. 9 is an example of a process of determining the communication condition as "good", "poor", "deteriorated", and "out of communication range", according to an error rate and other parameters. Note that this detection process is executed by the second SS-CPU 84 of the TV main unit 3 but may be executed by the TV microcomputer 64.

First, the packet error rate and a predetermined threshold value (first threshold value) Th1 are compared (S1601). The packet error rate refers to a rate of error contained in a received packet. When the packet error rate is smaller than the threshold value Th1 (YES in S1601), it is determined that the communication condition is "good" (S1602). The threshold value Th1 can be set for example at approximately 0.001. However, the threshold value Th1 is not to be limited to this and can be set at an optimum value depending on the situation.

Next, when the packet error rate is larger than the threshold value Th1 (NO in S1601), the number of times of retransmission and a predetermined threshold value (second threshold value) Th2 are compared (S1603). The number of times of retransmission refers to the number of times of transmitting the packet when the packet error rate is high and the packet becomes unrecoverable. When the number of times of retransmission is smaller than the threshold value Th2 (YES in S1603), it is determined that the communication condition is "poor" (S1604). Preferably, the threshold value Th2 is set to an upper limit above which an image is distorted. In this case, the "poor" communication condition refers to a condition under which the image is distorted. The threshold value Th2 can be set for example at approximately 3. However, the threshold value Th2 is not to be limited to this and can be set at an optimum value depending on the situation.

Then, when the number of times of the transmission is larger than the threshold value Th2 (NO in S1603), it is determined whether the communication condition is out of communication range (S1605). This determination step is executed by, e.g., monitoring whether or not the TV main unit 3 receives the "confirmation signal" within a predetermined period of time and whether or not the central wireless unit 2 receives the "ACK signal" within a predetermined time. The confirmation signal is a signal which the central wireless unit 2 transmits so as to confirm the presence of the TV main unit 3, which serves as its communication partner. The ACK signal is a signal which the TV main unit 3 transmits on receiving the confirmation signal. When it is determined that the communication condition is not out of communication range (NO in S1605), it is determined that the communication condition is "deteriorated" (S1606). Meanwhile, when it is determined that the communication condition is out of communication range, it is finally determined that the communication condition is "out of communication range" (S1607).

In FIG. 9, the determination steps (S1601 and S1603) are executed by using both the packet error rate and the number of times of retransmission. However, the communication condition may be determined by comparing only the packet error rate with the two threshold values. Similarly, the communication condition may be determined by comparing only the number of times of retransmission with the two threshold values. It is needless to say that use of more than two threshold values allows for more detailed determination. Therefore, for example, the communication condition can be determined by carrying out both (i) the two-step determination using the packet error rate and (ii) the two-step determination using the number of retransmission.

As described above, the communication (radio wave reception) condition is detected by using the "error rate" and the "number of times of retransmission request made based on the error rate". In addition, the communication (radio wave reception) condition can be detected by using other parameters such as a "field intensity", a "temporal change in the error rate", a "temporal change in the field intensity" and a "temporal change in the number of times of retransmission". Particularly, in a low-power mode for restraining power consumption, the radio wave condition is preferably determined in accordance with the field intensity, under such conditions that no video and/or audio data is transmitted and received.

As described above, the wireless AV system 1 identifies the content types according to program-related information, such as EPG, which is extracted from the AV data. However, even when information such as EPG is not contained in the AV data, the wireless AV system 1 can identify the content types according to the AV data. EPG is contained in signals transmitted from cable TV and digital broadcasting stations. However, such information is not contained in a signal transmitted from a conventional broadcasting station.

Described below are Case (1), where EPG is contained in a signal from a broadcasting station, and Case (2), where EPG is not contained in a signal from a broadcasting station.

Case (1)

The central wireless unit 2 modifies a transmission rate within a transmission rate range set in accordance with EPG program genres (Movie, News, Sport, Cartoon, Variety etc.). The TV main unit 3 transmits a "transmission rate modification request" to the central wireless unit 2. The request may contain information on a determined transmission rate. Alternatively, the request may contain only information indicative of whether the transmission rate is increased or decreased, so that the central wireless unit 2 determines the transmission rate.

A minimum transmission rate can be determined for example as follows. Note that an order of priority in image quality is predetermined, as in "Movie>Sport>Music Program>Drama>News>Variety>Cartoon." This order of priority can be changed freely by the user as needed.

Movie: 0×0B
Sport: 0×0A
Music Program: 0×09
Drama: 0×07
News: 0×05
Variety: 0×04
Cartoon: 0×03

This is an example in which a minimum transmission rate of Movie is set at "0×0B".

Case (2)

The central wireless unit 2 categorizes an image into any one of the following four types according to an intra-frame frequency component of the image and an inter-frame degree of change of the image.

(a) Intra-frame frequency component: High, Inter-frame degree of change: High
(b) Intra-frame frequency component: High, Inter-frame degree of change: Low
(c) Intra-frame frequency component: Low, Inter-frame degree of change: High
(d) Intra-frame frequency component: Low, Inter-frame degree of change: Low Note that the intra-frame frequency component and the inter-frame degree of change are determined to be "High" and "Low" by preset criteria. This information is transmitted, as content information, to the central wireless unit 2.

Specifically, it is determined that an "intra-frame frequency component is high," when $fb/fa>1$, where fa is a low-frequency component of the intra-frame frequency component and fb is a high-frequency component of the intra-frame frequency component. Further, it is determined that an "inter-frame degree of change is high," when the inter-frame degree of change is greater than $\theta d$, which is a threshold value of the inter-frame degree of change.

Moreover, maximum and minimum transmission rates can be set for example as follows.

(a) Max: 0×11 Min: 0×0B
(b) Max: 0×11 Min: 0×06
(c) Max: 0×11 Min: 0×0A
(d) Max: 0×11 Min: 0×05

For example, the maximum and minimum transmission rates (a) to (d) correspond to the following program genres (a) to (d).

(a) Movie and Music Program
(b) News and Drama
(c) Sport
(d) Variety and Cartoon These categorizations serve merely as examples and may be varied in actuality, depending on differences in image due to the program genres.

Thus, even when program-related information such as EPG is not available, a transmission rate in accordance with a content type can be set by using information on an intra-frame frequency component of an image and an inter-frame degree of change of the image.

Figure 10:
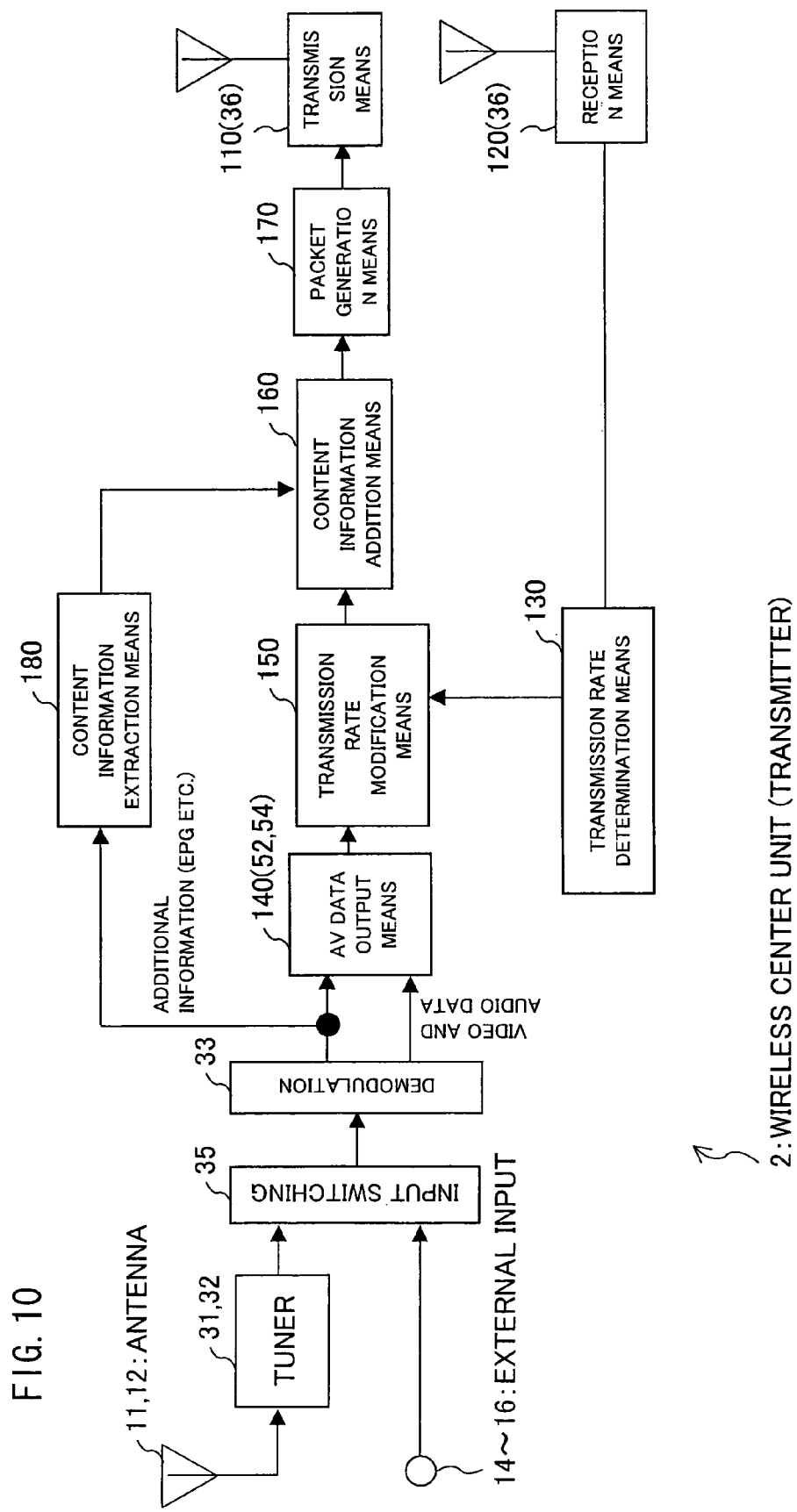
FIG. 10 is a block diagram showing a basic arrangement of the central wireless unit of the wireless AV system shown in FIG. 2.
Figure 11:
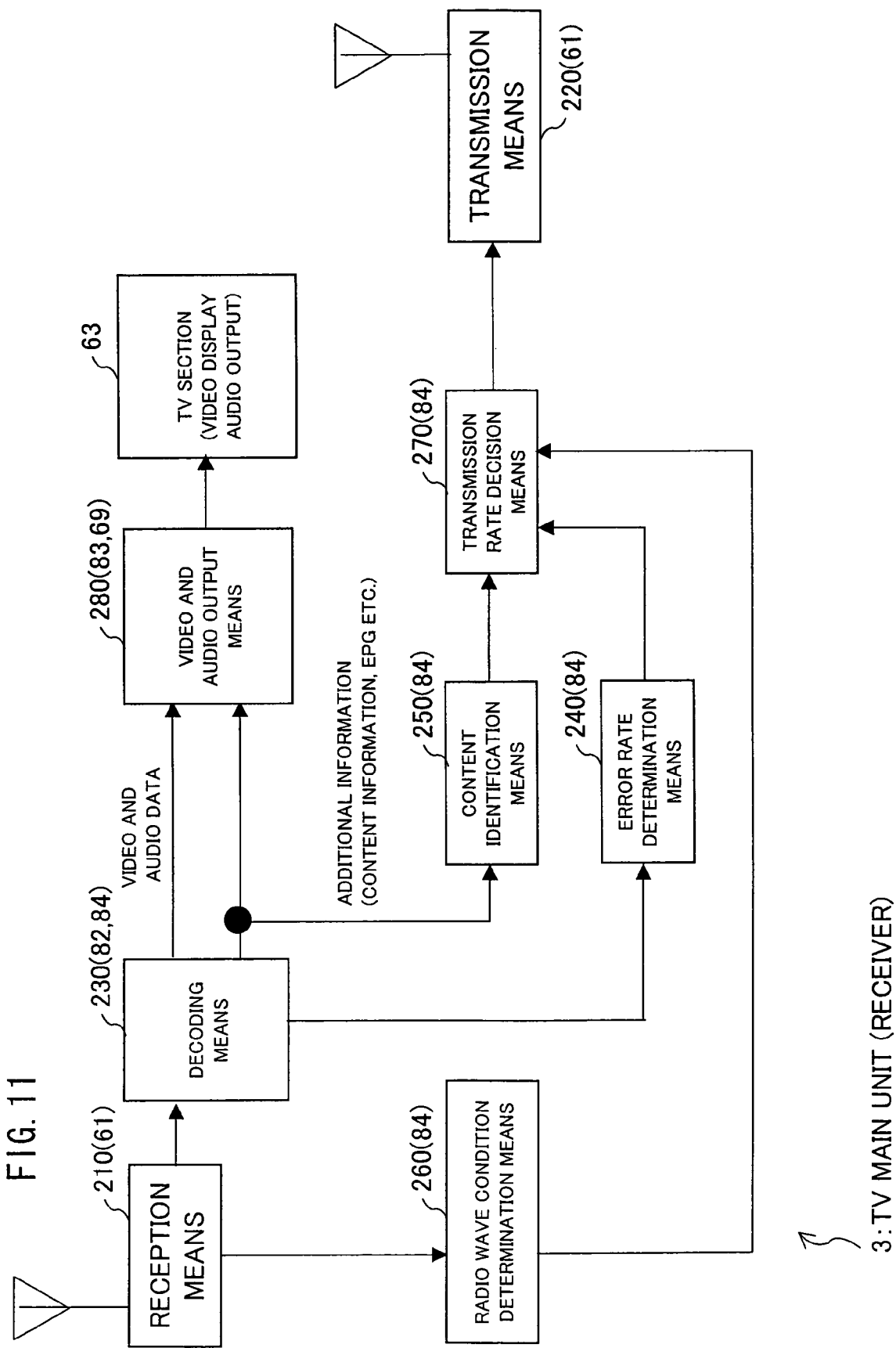
FIG. 11 is a block diagram showing a basic arrangement of the TV main unit of the wireless AV system shown in FIG. 2.

Described below is a detailed arrangement of the wireless AV system 1 applied to a separate-display wireless TV receiver, and examples of modification thereof. FIGS. 10 and 11 are block diagrams showing respective basic arrangements of the central wireless unit 2 and the TV main unit 3. For the sake of convenience in description, the components thus far described (in FIGS. 1 to 4) are given the same reference numerals, and the descriptions thereof are omitted.

As shown in FIG. 10, in the central wireless unit 2, the content information extraction means 180 extracts content information (information indicative of a content type) from additional information (e.g., EPG) contained in a signal from a broadcasting station or the like. The content information addition means 160 adds the content information to video and/or audio data encoded by the AV data output means 140, thereby generating content data. Further, the central wireless unit 2 receives from the TV main unit 3 a transmission rate modification request. The transmission rate determination means 130 determines the request, and the central wireless unit 2 causes the transmission rate modification means 150 to modify the transmission rate. Thus, the central wireless unit 2 can transmit the content data to the TV main unit 3 at the transmission rate requested by the TV main unit 3. The AV data output means 140 may take out, from the signal, only video and/or audio data necessary for output at the TV main unit 3, and the content information may be added to this data, so that the content data is generated.

Meanwhile, as shown in FIG. 11, in the TV main unit 3, the decoding means 230 decodes the video and/or audio data (content data) received from the central wireless unit 2, and the decoded data is combined with OSD display, so that the TV section 63 displays an image and outputs audio based on the combined data. At this time, the error rate determination means 240 determines an error rate of the content data thus received. Further, the radio wave condition determination means 260 determines a radio wave condition. Moreover, the transmission rate decision means 270 (second SS-CPU 84 or TV microcomputer 64) determines a transmission rate in accordance with a program genre, based on the content information contained in the content data thus received, the error rate, and the radio wave condition. The tables (FIGS. 6 and 7) of the content-specific MPEG rates are stored in the EEPROM 65 of the TV main unit 3 so that the transmission rate decision means 270 can refer to the MPEG rates. Moreover, the transmission rate decision means 270 transmits the determined transmission rate, as a "transmission rate modification request," to the central wireless unit 2.

Figure 12:
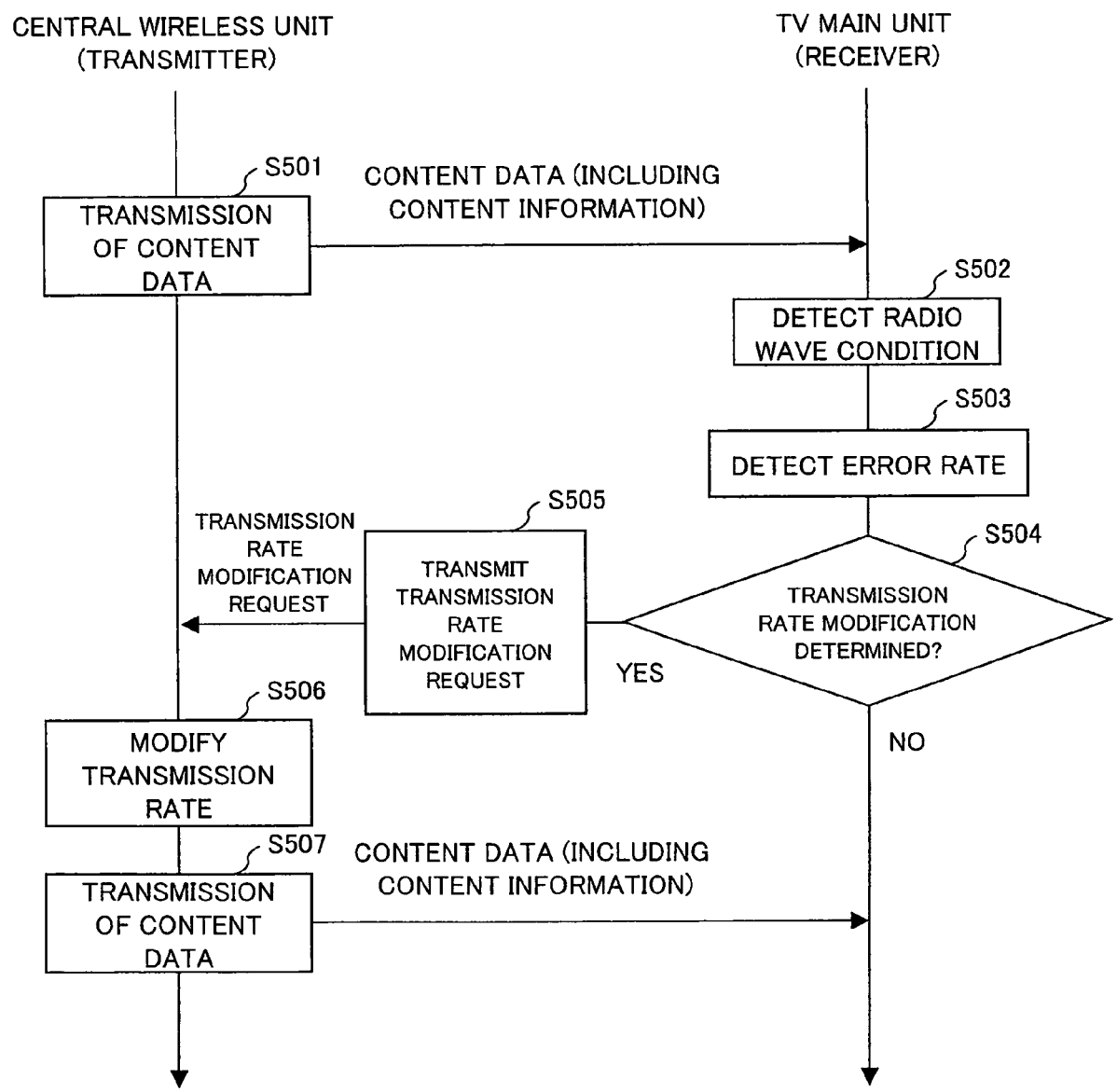
FIG. 12 is a sequence diagram showing transmission and reception of a signal between the central wireless unit and the TV main unit of the wireless AV system shown in FIG. 2.

Described below with reference to FIG. 12 are signals transmitted and received between the central wireless unit 2 and the TV main unit 3.

The central wireless unit (transmitter) 2 transmits to the TV main unit (receiver) 3 the content data generated from the AV data and the content information.

In the TV main unit 3, the radio wave condition determination means 260 detects a radio wave condition (S502), and the error rate determination means 240 detects an error rate of the content data thus received (S503). Moreover, an optimum transmission rate is calculated by the transmission rate decision means 270 according to the radio wave condition, the error rate, and the content type (S504). When the transmission rate decision means 270 determines that the transmission rate needs to be changed, the transmission rate decision means 270 transmits a transmission rate modification request to the central wireless unit 2 (S505).

The central wireless unit 2 receives the transmission rate modification request and causes the transmission rate determination means 130 and the transmission rate modification means 150 to modify the transmission rate accordingly (S506). Moreover, the content data is transmitted at the transmission rate thus modified (S507).

The content information may be always added to the AV data so as to be transmitted, or may be transmitted only when the content type is changed, separate from the AV data, as a command.

Modification examples of the wireless AV system 1 will be described below.

(A) In the central wireless unit 2, a content type of video and/or audio data to be transmitted is identified according to EPG, and a communication condition with the TV main unit 3 is detected. Moreover, a transmission rate of the video and/or audio data to be transmitted is set in accordance with the content type and the communication condition. The transmission rate is set by the first SS-CPU 54 (or the central wireless microcomputer 37) serving as transmission rate determination means. Moreover, the tables (FIGS. 6 and 7) of the content-specific MPEG rates are stored in the EEPROM 38 of the central wireless unit 2 so that the transmission rate determination means can refer to the MPEG rates.

According to this arrangement, a transmission rate modification process can be fully executed at the central wireless unit 2, so that an arrangement of the TV main unit 3 is simplified. When the TV main unit 3 is arranged so as to detect an error rate of the content data thus received and transmit the error rate as a command to the central wireless unit 2, the central wireless unit 2, as described above, becomes capable of setting an optimum transmission rate according to the radio wave condition, the error rate, and the content type.

(B) The central wireless unit 2 transmits video and/or audio data to the TV main unit 3. However, in this arrangement, content information indicative of a content type is not added to the AV data. Meanwhile, when the TV main unit 3 receives the video and/or audio data, the TV main unit 3 detects a communication condition and an error rate with the TV main unit 3 and transmits the detection results as a command to the central wireless unit 2. The central wireless unit 2 sets a transmission rate of the video and/or audio data to be transmitted, according to the command (information indicative of the communication condition and the error rate received from the TV main unit 3) and the content type that has been identified. The transmission rate is set by the second SS-CPU 84 (or TV microcomputer 64) serving as the transmission rate decision means 270. Moreover, the tables (FIGS. 6 and 7) of the content-specific MPEG rates are stored in the EEPROM 65 of the TV main unit 3 so that the transmission rate decision means 270 can refer to the MPEG rates.

According to this arrangement, during the AV data transmission process, the content type is not identified, nor is the content information added. Therefore, an arrangement of the central wireless unit 2 is simplified.

As described above, the wireless system 1 according to the present embodiment includes the central wireless unit 2, serving as a base device, and the TV main unit 3. The central wireless unit 2 includes the BS tuner 31, the U/VHF tuner 32, the video and audio demodulation section 33, the audio switching section 34, the SS transmitter/receiver (T/R) unit 36, the central wireless microcomputer 37, the EEPROM 38, and the first SS-CPU 54. The video and audio demodulation section 33 demodulates a video and audio signal selected and received by the BS tuner 31 and the U/VHF tuner 32. The audio switching section 34 switches between (i) audio received based on an audio switching signal, and (ii) program-related information such as EPG. The SS T/R unit 36 converts AV data into an MPEG-2 video compression format and transmits the format to the TV main unit 3 according to an SS wireless method. The central wireless microcomputer 37 entirely controls the central wireless unit 2. The EEPROM 38 stores content-specific MPEG rates. The first SS-CPU 54 detects a communication condition between the central wireless unit 2 and the TV main unit 3 according to the field intensity of the received radio wave and the retransmission request based on the error rate. The central wireless microcomputer 37 identifies a content type of the video and audio data to be transmitted, according to EPG. Further, according to the communication condition that has been detected, the central wireless microcomputer 37 sets a transmission rate of the video and audio data to be transmitted. Furthermore, according to the content type that has been identified, the central wireless microcomputer 37 executes transmission rate modification control by modifying the transmission rate with reference to the MPEG rates shown in FIGS. 6 and 7. That is, when the communication condition is changed (particularly when it deteriorates), the bit rates are varied in accordance with the content type of the AV data, instead of decreasing the bit rates at a uniform rate as with the conventional example. Thus, even when the communication condition deteriorates, it is possible to minimize deterioration of video and audio data and maintain, as much as possible, transmission of data such as a news program, which is required to perform an informative function.

Note that the wireless AV system 1 is not limited to the foregoing embodiment, but may be varied in many ways as long as it does not depart from the gist of the present invention. For example, although the wireless AV system 1 according to the foregoing embodiment is applied to a portable TV serving as a wireless AV device, it can be applied not only to a TV receiver but also to a wireless communication apparatus or a combination thereof. Examples of the AV device may include a VTR (video tape recorder), an HDD player, and a DVD player. Further, the apparatus capable of transmitting and receiving data may be an apparatus which has information device functions, such as a personal computer. That is, the wireless AV system 1 can be applied to all systems. Further, transmission and reception data may contain any type of content.

Further, in the present embodiment, the wireless AV system 1 is applied to, but is not to be limited to, a TV receiver. The wireless AV system 1 can be applied to a tuner, a personal computer, and other AV devices using tuners, as described above.

Further, the types of the processing sections constituting the apparatuses of the wireless AV system 1 and the types and formats of configuration information are not to be limited to those described in the foregoing embodiment. Particularly, the present invention is suitably applied to a device in conformity with HAVi.

Further, the AV data is transmitted in a form of an MPEG stream encoded in conformity with an MPEG-2 encoding method. However, the AV data may be transmitted either in a form of an MPEG stream encoded in conformity with another MPEG method, or in a form of a non-MPEG stream. Further, the content types and the MPEG rates shown in FIGS. 6 and 7 serve merely as examples and are not to be limited to those shown in FIGS. 6 and 7.

Further, in the present embodiment, names such as "wireless communication apparatus" and "wireless AV system" are used for the sake of convenience in the description, but such names as "wireless communication device", "AV device", "channel selection apparatus", and the like may be used.

Each of the apparatuses of the wireless AV system 1 described above can be realized by using a program for causing the apparatus to function. This program is stored in a computer-readable storage medium. In the present invention, such a computer program storage medium may be a main memory. Alternatively, a storage medium may be used which can be read by inserting the storage medium in an external storage device. In either of the cases, the contained program may be arranged so as to be accessible to a CPU which will execute the program. Further, the program may be arranged so as to be read and then downloaded to a program storage area (not shown) where the program is executed. Assume that the download program is prestored in the apparatus.

In addition, the program medium is a storage medium arranged so that it can be separated from the main body. Examples of such a program medium include a tape, such as a magnetic tape and a cassette tape; a magnetic disk, such as a floppy (trademark) disk and a hard disk; an optical disc, such as a CD/MO/MD/DVD; a card, such as an IC card and an optical card; and a semiconductor memory, such as a mask ROM, an EPROM (erasable programmable read only memory), an EEPROM (electrically erasable programmable read only memory), or a flash ROM. All these storage media hold a program in a fixed manner.

Alternatively, if there is provided means (not shown) which can connects to an external communications network, the program medium may be a storage medium carrying the program in a flowing manner as in the downloading of a program over the communications network. Further, when the program is downloaded over a communications network in this manner, the download program may be prestored in the apparatus or installed from another storage medium. The storage medium may contain data as well as a program.

The present embodiment is not to limit the scope of the present invention, but can be varied in many ways within the scope of the present invention. For example, the following arrangements are possible.

A wireless communication apparatus of the present invention may be a wireless communication apparatus for transmitting video and audio data at a predetermined bit rate, the wireless communication apparatus including: communication condition detection means for detecting a communication condition; content identification means for identifying a content type of the video and audio data to be transmitted; and transmission rate setting means for setting a transmission rate of the video and audio data to be transmitted, according to the communication condition thus detected and the content type thus identified.

Furthermore, the communication condition detection means may detect the communication condition according to (i) a field intensity of a received radio wave, (ii) an error rate, or (iii) a number of times of retransmission request made based on the error rate.

Furthermore, the communication condition detection means may detect a communication condition between wireless communication apparatuses linked to each other.

More preferably and more specifically, the content identification means identifies at least one type of content selected from the content group consisting of a movie, a news program, a drama, and a music program.

More preferably, the transmission rate setting means sets a bit rate and a maximum number of times of retransmission for each content type.

More preferably, the transmission rate setting means sets a bit rate and a maximum number of times of retransmission at maximum and minimum transmission rates which are set for each content type.

Furthermore, the video and audio data may be transmitted in a form of an MPEG stream encoded in conformity with an MPEG encoding method.

Furthermore, the video and audio data may be transmitted according to an SS wireless method.

Further, a wireless AV system of the present invention includes a plurality of wireless communication apparatuses connected through a wireless network. Each of the plurality of wireless communication apparatuses is an apparatus according to the foregoing wireless communication apparatus.

More specifically, the wireless communication apparatus may be a television receiver including: a display device; a broadcast receiving tuner; and a central device for transmitting video and audio data to the display device.

Further, a wireless transmission method of the present invention may be a wireless transmission method for transmitting video and audio data at a predetermined bit rate, the method including the steps of: detecting a communication condition; identifying a content type of the video and audio data to be transmitted; setting a transmission rate of the video and audio data to be transmitted, according to the communication condition that has been detected; and modifying the transmission rate thus set, according to the content type that has been identified.

Further, a program of the present invention is a program for causing a computer to execute a wireless transmission method for transmitting video and audio data at a predetermined bit rate, the method including the steps of: detecting a communication condition; identifying a content type of the video and audio data to be transmitted; setting a transmission rate of the video and audio data to be transmitted, according to the communication condition that has been detected; and modifying the transmission rate thus set, according to the content type that has been identified.

Furthermore, a computer-readable storage medium of the present invention stores a program for causing a computer to execute a wireless transmission method for transmitting video and audio data at a predetermined bit rate, the method including the steps of: detecting a communication condition; identifying a content type of the video and audio data to be transmitted; setting a transmission rate of the video and audio data to be transmitted, according to the communication condition that has been detected; and modifying the transmission rate thus set, according to the content type that has been identified.

Further, a transmitter of the present invention may be a transmitter for transmitting video and/or audio data to a receiver, the transmitter including transmission rate setting means for setting a transmission rate of the video and/or audio data to be transmitted.

Furthermore, the transmitter of the present invention may be arranged such that the video and/or audio data to be transmitted has a plurality of content types, and the transmission rate setting means sets the transmission rate of the video and/or audio data to be transmitted, according to each of the content types.

Furthermore, the transmitter of the present invention may be arranged such that the transmission rate setting means sets a bit rate and/or a maximum number of times of retransmission for each of the content types.

Furthermore, the transmitter of the present invention may be arranged so as to include content identification means for identifying the content type of the video and/or audio data to be transmitted.

Furthermore, the transmitter of the present invention may be arranged such that the content identification means identifies the content type of the video and/or audio data to be transmitted, according to program-related information such as EPG (Electrical Program Guide).

Furthermore, the transmitter of the present invention may be arranged so as to include communication condition detection means for detecting a communication condition, and may be arranged such that the transmission rate setting means sets the transmission rate of the video and/or audio data to be transmitted, according to the communication condition thus detected.

Furthermore, the transmitter of the present invention may be arranged such that the communication condition detection means detects the communication condition according to at least one of (i) a field intensity of a received radio wave, (ii) an error rate, and (iii) a number of times of retransmission request made based on the error rate.

Furthermore, the transmitter of the present invention may be arranged such that the communication condition detection means detects the communication condition with a receiver with which a communications link is established.

Furthermore, the transmitter of the present invention may be arranged such that the video and/or audio data is transmitted according to a spread spectrum wireless method.

Furthermore, the transmitter of the present invention may be arranged such that the video and/or audio data is transmitted by means of a wireless LAN or a low-power short-range two-way wireless communications technology such as Bluetooth or UWB (Ultra Wide Band).

Furthermore, the transmitter of the present invention may be arranged such that the video and/or audio data is transmitted in a form of an MPEG stream encoded in conformity with an MPEG encoding method.

Furthermore, the transmitter of the present invention may be arranged such that the video and/or audio data to be transmitted is externally inputted.

Furthermore, the transmitter of the present invention may be arranged such that the video and/or audio data to be transmitted is inputted from a broadcast receiving tuner.

Further, a receiver of the present invention receives video and/or audio data from the foregoing transmitter.

Furthermore, the receiver of the present invention may be arranged so as to include a display device for displaying a video signal based on the video data thus received.

Further, a wireless system of the present invention is arranged so as to include the foregoing transmitter and the foregoing transmitter.

Further, a transmitter control method of the present invention may be a method including the steps of: setting a transmission rate of video and/or audio data to be transmitted; and transmitting the video and/or audio data at the transmission rate thus set.

Further, a transmitter control program of the present invention is a control program for controlling the foregoing transmitter and causing a computer to function as the foregoing means.

Further, a computer-readable storage medium of the present invention stores the foregoing transmitter control program.

Further, a transmitter of the present invention may be a transmitter for transmitting video and/or audio data to a receiver, the transmitter including: reception means for receiving, from the receiver, reception data containing information indicative of a transmission rate determined at the receiver; and transmission rate setting means for setting the transmission rate of the video and/or audio data to be transmitted, according to the reception data.

Furthermore, the transmitter of the present invention may be arranged such that the video and/or audio data to be transmitted has a plurality of content types, and the transmitter may include content information addition means for adding, to the video and/or audio data to be transmitted, content information indicative of the content type of the video and/or audio data.

Furthermore, the transmitter of the present invention may be arranged such that the content information addition means identifies the content type of the video and/or audio data to be transmitted.

Furthermore, the transmitter of the present invention may be arranged such that the content information addition means identifies the content type of the video and/or audio data to be transmitted, according to program-related information such as EPG (Electrical Program Guide).

Furthermore, the transmitter of the present invention may be arranged such that the transmission rate setting means sets a bit rate and/or a maximum number of times of retransmission for each of the content types.

Furthermore, the transmitter of the present invention may be arranged such that the video and/or audio data is transmitted according to a spread spectrum wireless method.

Furthermore, the transmitter of the present invention may be arranged such that the video and/or audio data is transmitted by means of a wireless LAN or a low-power short-range two-way wireless communications technology such as Bluetooth or UWB (Ultra Wide Band).

Furthermore, the transmitter of the present invention may be arranged such that the video and/or audio data is transmitted in a form of an MPEG stream encoded in conformity with an MPEG encoding method.

Furthermore, the transmitter of the present invention may be arranged such that the video and/or audio data to be transmitted is externally inputted.

Furthermore, the transmitter of the present invention may be arranged such that the video and/or audio data to be transmitted is inputted from a broadcast receiving tuner.

Further, a receiver of the present invention may be a receiver for receiving video and/or audio data from a transmitter, the receiver including: transmission rate decision means for deciding a transmission rate at which the video and/or audio data is transmitted; and transmission means for transmitting, to the transmitter, transmission data containing information indicative of the transmission rate thus decided.

Furthermore, the receiver of the present invention may be arranged such that the video and/or audio data to be transmitted has a plurality of content types, and the transmission rate decision means decides the transmission rate according to the video and/or audio data to be transmitted.

Furthermore, the receiver of the present invention may be arranged such that the transmission rate decision means sets a bit rate and/or a maximum number of times of retransmission for each of the content types.

Furthermore, the receiver of the present invention may be arranged so as to include content identification means for identifying the content type of the video and/or audio data to be transmitted.

Furthermore, the receiver of the present invention may be arranged such that the content identification means identifies the content type of the video and/or audio data to be transmitted, according to program-related information such as EPG (Electrical Program Guide).

Furthermore, the receiver of the present invention may include communication condition detection means for detecting a communication condition, and may be arranged such that the transmission rate decision means sets the transmission rate according to the communication condition thus detected.

Furthermore, the receiver of the present invention may be arranged such that the communication condition detection means detects the communication condition according to at least one of (i) a field intensity of a received radio wave, (ii) an error rate, and (iii) a number of times of retransmission request made based on the error rate.

Furthermore, the receiver of the present invention may be arranged such that the communication condition detection means detects the communication condition with a transmitter with which a communications link is established.

Furthermore, the receiver of the present invention may be arranged so as to include a display device for displaying a video signal based on the video data thus received.

Further, a wireless system of the present invention includes the foregoing transmitter and the foregoing receiver.

Further, a transmitter control method according to the present invention is a method for controlling a transmitter which transmits video and/or audio data to a receiver, the method including the steps of: receiving, from the receiver, reception data containing information indicative of a communication condition detected at the receiver; and setting a transmission rate of the video and/or audio data to be transmitted, according to the reception data.

Further, a transmitter control program of the present invention is a control program for controlling the foregoing transmitter and causing a computer to function as the foregoing means.

Further, a computer-readable storage medium of the present invention stores the foregoing transmitter control program.

Further, a receiver control method of the present invention is a method for controlling a receiver which receives video and/or audio data from a transmitter, the method including the steps of: deciding a transmission rate at which the video and/or audio data is transmitted; and transmitting, to the transmitter, transmission data containing information indicative of the transmission rate thus decided.

Further, a receiver control program of the present invention is a control program for controlling the foregoing receiver and causing a computer to function as the foregoing means.

Further, a computer-readable storage medium of the present invention stores the foregoing receiver control program.

Further, a transmitter according to the present invention may be a transmitter for transmitting video and/or audio data to a receiver, the transmitter including: reception means for receiving, from the receiver, reception data containing information indicative of a communication condition detected at the receiver; and transmission rate setting means for setting a transmission rate of the video and/or audio data to be transmitted, according to the reception data.

Further, a transmitter control method according to the present invention may be a method for controlling a transmitter which transmits video and/or audio data to a receiver, the method including the steps of: receiving, from the receiver, reception data containing information indicative of a communication condition detected at the receiver; and setting a transmission rate of the video and/or audio data to be transmitted, according to the reception data.

According to the foregoing arrangement, it is possible to cause the receiver to detect the communication condition and cause the transmitter to set the transmission rate of the video and/or audio data to be transmitted, according to the information indicative of the communication condition, the information being contained in reception data received from the receiver. Thus, even when the communication condition deteriorates, it is possible to minimize deterioration of the video and audio data and maintain the transmission rate of the data as much as possible. Therefore, it is possible to maintain an optimum communication condition in an entire network.

Furthermore, the transmitter according to the present invention may be arranged such that the video and/or audio data to be transmitted has a plurality of content types, and the transmission rate setting means sets the transmission rate of the video and/or audio data to be transmitted, according to each of the content types.

According to the foregoing arrangement, it is possible to set the transmission rate according to the content type, depending on a change in the communication condition. Specifically, in the case of a program such as "News" whose sound-transmitting function is emphasized, an error rate needs to be suppressed at the cost of image quality, by sufficiently decreasing a transmission rate of the program. Further, in the case of a program such as "Movie" whose image-transmitting function is emphasized, deterioration in image quality needs to be suppressed, by suppressing a degree by which a transmission rate of the program is decreased. Therefore, even when the communication condition deteriorates, it is possible to minimize deterioration of the video and/or audio data by maintaining the transmission rate according to the content type.

Furthermore, the transmitter according to the present invention may be arranged such that the transmission rate setting means sets a bit rate and/or a maximum number of times of retransmission for each of the content types.

According to the foregoing arrangement, it is possible to set the bit rate and/or the maximum number of times of retransmission according to the content type. Therefore, even when the communication state deteriorates, it is possible to minimize deterioration of the video and audio data by maintaining the bit rate and/or the number of times of retransmission according to the content type.

Furthermore, the transmitter according to the present invention may be arranged so as to include content identification means for identifying the content type of the video and/or audio data to be transmitted.

According to the foregoing arrangement, the transmitter can identify the content type of the video and/or audio data to be transmitted, so as to set the transmission rate based on the content type thus identified.

Furthermore, the transmitter according to the present invention may be arranged such that the content identification means identifies the content type of the video and/or audio data to be transmitted, according to program-related information such as EPG (Electrical Program Guide).

According to the foregoing arrangement, it is possible to set the transmission rate according to the content type by using program-related information such as EPG. The program-related information, such as EPG, may be inputted into the transmitter from a broadcast receiving tuner and the like, either together with or separately from the video and/or audio data to be transmitted.

Furthermore, the transmitter according to the present invention may be arranged such that the content identification means identifies the content type of the video and/or audio data to be transmitted, according to information on an intra-frame frequency component of the video data and an inter-frame degree of change of the video data.

According to the foregoing arrangement, even when the program-related information, such as EPG, is not available, it is possible to set the transmission rate according to the content type.

Furthermore, the transmitter according to the present invention may be arranged such that the video and/or audio data is transmitted according to a spread spectrum wireless method.

The foregoing transmitter is suitable for a wireless communication apparatus operating according to the spread spectrum wireless method.

Furthermore, the transmitter according to the present invention may be arranged such that the video and/or audio data is transmitted by means of a wireless LAN or a low-power short-range two-way wireless communications technology such as Bluetooth or UWB (Ultra Wide Band).

The foregoing transmitter is suitable for a wireless communication apparatus which performs communications by means of a wireless LAN or a low-power short-range two-way wireless communications technology such as Bluetooth or UWB (Ultra Wide Band).

Furthermore, the transmitter according to the present invention may be arranged such that the video and/or audio data is transmitted in a form of an MPEG stream encoded in conformity with an MPEG encoding method.

The foregoing transmitter is suitable for a wireless communication apparatus which transmits the video and/or audio data in the form of the MPEG stream encoded in conformity with the MPEG encoding method.

Furthermore, the transmitter according to the present invention may be arranged such that the video and/or audio data is inputted from a broadcast receiving tuner.

The foregoing transmitter is suitable, for example, for a separate-display wireless TV receiver which causes the video and/or audio data inputted from the broadcast receiving tuner to be transmitted to a wireless terminal.

Further, a receiver according to the present invention is a receiver for receiving video and/or audio data from a transmitter, the receiver including: communication condition detection means for detecting a communication condition; and transmission means for transmitting, to the transmitter, transmission data containing information indicative of the communication condition detected by the communication condition detection means.

Further, a receiver control method according to the present invention is a method for controlling a receiver which receives video and/or audio data from a transmitter, the control method including the steps of: detecting a communication condition; and transmitting, to the transmitter, transmission data containing information indicative of the communication condition thus detected.

According to the foregoing arrangement, it is possible to detect the communication condition at the receiver and transmit, to the transmitter, transmission data containing the information indicative of the communication condition thus detected. Further, at the transmitter, it is possible to set the transmission rate of the video and/or audio data to be transmitted, according to the information indicative of the communication condition, the information being contained in reception data received from the receiver. Thus, even when the communication condition deteriorates, it is possible to minimize deterioration of the video and audio data and maintain the transmission rate of the data as much as possible. Therefore, it is possible to maintain an optimum communication condition in an entire network.

Furthermore, the receiver according to the present invention may be arranged such that the communication condition detection means detects the communication condition according to at least one of (i) a field intensity of a received radio wave, (ii) an error rate, and (iii) a number of times of retransmission request made based on the error rate.

According to the foregoing receiver, the field intensity of the received radio wave, the error rate, and the number of times of retransmission request made based on the error rate can be suitably used as parameters for detecting the communication condition. Further, by combining the plural types of parameters, the communication condition can be detected effectively.

Furthermore, the receiver according to the present invention may be arranged such that the communication condition detection means detects the communication condition with the transmitter with which a communications link is established.

According to the foregoing arrangement, it is possible to detect the communication condition with the transmitter with which a communications link is established.

Furthermore, the receiver according to the present invention may be arranged so as to include a display device which displays a video signal according to the video data received.

The foregoing receiver is suitable, for example, for a separate-display wireless TV receiver which includes a display device so as to display a video signal according to the video data received.

Further, a wireless system according to the present invention may be arranged so as to include the foregoing transmitter and the foregoing receiver.

According to the foregoing arrangement, it is possible to detect the communication condition at the receiver and transmit, to the transmitter, transmission data containing the information indicative of the communication condition thus detected. Further, at the transmitter, it is possible to set the transmission rate of the video and/or audio data to be transmitted, according to the information indicative of the communication condition, the information being contained in reception data received from the receiver. Thus, even when the communication condition deteriorates, it is possible to minimize deterioration of the video and audio data and maintain the transmission rate of the data as much as possible. Therefore, it is possible to maintain an optimum communication condition in an entire network.

Further, a transmitter according to the present invention is a transmitter for transmitting, to a receiver, video and/or audio data having a plurality of content types, the transmitter including: content identification means for identifying each of the content types of the video and/or audio data to be transmitted, according to information on an intra-frame frequency component of the video data and an inter-frame degree of change of the video data; and transmission rate setting means for setting a transmission rate of the video and/or audio data to be transmitted, according to the content type.

Further, a transmitter control method according to the present invention is a method for controlling a transmitter which transmits, to a receiver, video and/or audio data having a plurality of content types, the method including the steps of: identifying each of the content types of the video and/or audio data to be transmitted, according to information on an intra-frame frequency component of the video data and an inter-frame degree of change of the video data; and setting a transmission rate of the video and/or audio data to be transmitted, according to the content type.

According to the foregoing arrangement, even when program-related information, such as EPG, is not available, it is possible to identify the content type of the video and/or audio data to be transmitted. Moreover, it is possible to set the transmission rate of the video and/or audio data to be transmitted, according to the content type thus identified.

Therefore, it is possible to set the transmission rate at the transmitter, according to the content type. Specifically, in the case of a program such as "News" whose sound-transmitting function is emphasized, an error rate needs to be suppressed at the cost of image quality, by sufficiently decreasing a transmission rate of the program. Further, in the case of a program such as "Movie" whose image-transmitting function is emphasized, deterioration in image quality needs to be suppressed, by suppressing a degree by which a transmission rate of the program is decreased. Therefore, even when the communication condition deteriorates, it is possible to minimize deterioration of the video and/or audio data by maintaining the transmission rate according to the content type.

A transmitter according to the present invention is a transmitter for transmitting, to a receiver, video and/or audio data having a plurality of content types, the transmitter including: content identification means for identifying each of the content types of the video and/or audio data to be transmitted, according to information on an intra-frame frequency component of the video data and an inter-frame degree of change of the video data; content information addition means for adding, to the video and/or audio data to be transmitted, content information indicative of the content type of the video and/or audio data; reception means for receiving, from the receiver, reception data containing information indicative of a transmission rate determined at the receiver; and transmission rate setting means for setting the transmission rate of the video and/or audio data to be transmitted, according to the reception data.

A transmitter control method according to the present invention is a method for controlling a transmitter which transmits, to a receiver, video and/or audio data having a plurality of content types, the control method including the steps of: identifying each of the content types of the video and/or audio data to be transmitted, according to information on an intra-frame frequency component of the video data and an inter-frame degree of change of the video data; adding, to the video and/or audio data to be transmitted, content information indicative of the content type of the video and/or audio data; receiving, from the receiver, reception data containing information indicative of a transmission rate determined at the receiver; and setting the transmission rate of the video and/or audio data to be transmitted, according to the reception data.

According to the foregoing arrangement, even when program-related information, such as EPG, is not available, the transmitter can identify the content type of the video and/or audio data to be transmitted. Moreover, the transmitter adds the content information indicative of the content type thus identified to the video and/or audio data to be transmitted, so that the content information is transmitted to the receiver. Furthermore, the transmitter receives from the receiver the reception data containing the information indicative of the transmission rate determined at the receiver, and sets the transmission rate of the video and/or audio data to be transmitted, according to the reception data.

Therefore, the transmitter can transmit the video and/or audio data at the transmission rate determined at the receiver according to the content type. Thus, even when the communication condition deteriorates, it is possible to minimize deterioration of the video and/or audio data by maintaining the transmission rate according to the content type.

The transmitter may be achieved by computer. In such a case, a computer-readable storage medium storing a transmitter control program for causing a computer to function as the means is also included in the scope of the present invention.

The receiver may be achieved by computer. In such a case, a computer-readable storage medium storing a receiver control program for causing a computer to function as the means is also included in the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A wireless system of the present invention is suitable for, but is not limited to, a home AV network system, such as a separate-display wireless TV receiver, which transmits video and/or audio data by wireless. The wireless system can be widely applied to a wireless communication device such as a mobile phone/PHS (Personal Handyphone System) (registered trademark) or PDA (Personal Digital Assistant).

The invention claimed is:

1. A transmitter for transmitting video data and/or audio data to a receiver, the transmitter comprising:
a reception unit receiving, from the receiver, reception data containing information indicative of a communication condition detected at the receiver, wherein the communication condition is a detected signal strength or a detected channel interference; and
a transmission rate setting unit setting a transmission rate of the video data and/or audio data to be transmitted, wherein:
the video data and/or audio data to be transmitted has a plurality of content types, and
the transmission rate setting unit sets the transmission rate of the video data and/or audio data to be transmitted, according to the reception data and according to each of the content types.

2. The transmitter according to claim 1, wherein the transmission rate setting unit sets a bit rate and/or a maximum number of times of retransmission for each of the content types.

3. The transmitter according to claim 1, comprising a content identification unit identifying the content type of the video data and/or audio data to be transmitted.

4. The transmitter according to claim 1, wherein the video data and/or audio data is transmitted according to a spread spectrum wireless method.

5. The transmitter according to claim 1, wherein the video data and/or audio data is transmitted by a wireless LAN or a low-power short-range two-way wireless communications technology such as Bluetooth or UWB (Ultra Wide Band).

6. The transmitter according to claim 1, wherein the video data and/or audio data is transmitted in a form of an MPEG stream encoded in conformity with an MPEG encoding method.

7. The transmitter according to claim 1, wherein the video data and/or audio data is inputted from a broadcast receiving tuner.

8. A transmitter for transmitting video data and/or audio data to a receiver, the transmitter comprising:
a reception unit receiving, from the receiver, reception data containing information indicative of a communication condition detected at the receiver;
a transmission rate setting unit setting a transmission rate of the video data and/or audio data to be transmitted, according to the reception data, wherein:
the video data and/or audio data to be transmitted has a plurality of content types, and
the transmission rate setting unit sets the transmission rate of the video data and/or audio data to be transmitted, according to each of the content types; and
a content identification unit identifying the content type of the video data and/or audio data to be transmitted, wherein the content identification unit identifies the content type of the video data and/or audio data to be transmitted, according to program-related information such as EPG (Electrical Program Guide).

9. A transmitter for transmitting video data and/or audio data to a receiver, the transmitter comprising:
a reception unit receiving, from the receiver, reception data containing information indicative of a communication condition detected at the receiver;
a transmission rate setting unit setting a transmission rate of the video data and/or audio data to be transmitted, according to the reception data, wherein:
the video data and/or audio data to be transmitted has a plurality of content types, and
the transmission rate setting unit sets the transmission rate of the video data and/or audio data to be transmitted, according to each of the content types; and
a content identification unit identifying the content type of the video data and/or audio data to be transmitted, wherein the content identification unit identifies the content type of the video data and/or audio data to be transmitted, according to information on an intra-frame frequency component of the video data and an inter-frame degree of change of the video data.

10. A wireless system comprising:
the transmitter according to claim 1; and
the receiver according to claim 1.

11. A transmitter control method for controlling a transmitter which transmits video data and/or audio data to a receiver, the method comprising the steps of:
receiving, from the receiver, reception data containing information indicative of a communication condition detected at the receiver, wherein the communication condition is a detected signal strength or a detected channel interference;
setting a transmission rate of the video data and/or audio data to be transmitted, wherein:
the video data and/or audio data to be transmitted has a plurality of content types; and
setting the transmission rate of the video data and/or audio data to be transmitted, according to the reception data and according to each of the content types.

12. A transmitter for transmitting, to a receiver, video data and/or audio data having a plurality of content types, the transmitter comprising:
content identification unit identifying each of the content types of the video data and/or audio data to be transmitted, according to information on an intra-frame frequency component of the video data and an inter-frame degree of change of the video data; and
transmission rate setting unit setting a transmission rate of the video data and/or audio data to be transmitted, according to the content type.

13. A method for controlling a transmitter which transmits, to a receiver, video data and/or audio data having a plurality of content types, the method comprising the steps of:
identifying each of the content types of the video data and/or audio data to be transmitted, according to information on an intra-frame frequency component of the video data and an inter-frame degree of change of the video data; and setting a transmission rate of the video data and/or audio data to be transmitted, according to the content type.

14. A transmitter for transmitting, to a receiver, video data and/or audio data having a plurality of content types, the transmitter comprising:

content identification unit identifying each of the content types of the video data and/or audio data to be transmitted, according to information on an intra-frame frequency component of the video data and an inter-frame degree of change of the video data;

content information addition unit adding, to the video data and/or audio data to be transmitted, content information indicative of the content type of the video data and/or audio data;

reception unit receiving, from the receiver, reception data containing information indicative of a transmission rate determined at the receiver; and transmission rate setting unit setting the transmission rate of the video data and/or audio data to be transmitted, according to the reception data.

15. A method for controlling a transmitter which transmits, to a receiver, video data and/or audio data having a plurality of content types, the method comprising the steps of:

identifying each of the content types of the video data and/or audio data to be transmitted, according to information on an intra-frame frequency component of the video data and an inter-frame degree of change of the video data;

adding, to the video data and/or audio data to be transmitted, content information indicative of the content type of the video data and/or audio data;

receiving, from the receiver, reception data containing information indicative of a transmission rate determined at the receiver; and setting the transmission rate of the video data and/or audio data to be transmitted, according to the reception data.

16. A computer-readable medium having instructions stored thereon, such that when the instructions are read and executed by a processor, the processor is configured to control the transmitter, storing the transmitter control program according to claim 1.

17. A computer-readable medium having instructions stored thereon, such that when the instructions are read and executed by a processor, the processor is configured to control the transmitter according to claim 12.

18. A computer-readable medium having instructions stored thereon, such that when the instructions are read and executed by a processor, the processor is configured to control the transmitter according to claim 14.

\* \* \* \* \*

UNITED STATES PATENT AND TRADEMARK OFFICE
CERTIFICATE OF CORRECTION

PATENT NO.       : 7,636,132 B2                                            Page 1 of 1
APPLICATION NO. : 10/553371
DATED            : December 22, 2009
INVENTOR(S)      : Kenji Sakamoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this

Ninth Day of November, 2010

David J. Kappos
*Director of the United States Patent and Trademark Office*